(12) United States Patent
Baker et al.

(10) Patent No.: US 7,580,380 B2
(45) Date of Patent: Aug. 25, 2009

(54) COMMUNICATIONS SYSTEMS AND METHODS

(75) Inventors: David Baker, Cambridgeshire (GB); Mark Justin Moore, Cambridgeshire (GB)

(73) Assignee: Artimi Ltd, Cambridge (GB)

( * ) Notice: Subject to any disclaimer, the term of this patent is extended or adjusted under 35 U.S.C. 154(b) by 635 days.

(21) Appl. No.: 10/516,747

(22) PCT Filed: May 21, 2004

(86) PCT No.: PCT/GB2004/002201

§ 371 (c)(1),
(2), (4) Date: Oct. 14, 2005

(87) PCT Pub. No.: WO2004/107678

PCT Pub. Date: Dec. 9, 2004

(65) Prior Publication Data

US 2006/0120433 A1    Jun. 8, 2006

(30) Foreign Application Priority Data

May 28, 2003    (GB) .................................. 0312197.7

(51) Int. Cl.
*H04B 7/00* (2006.01)
(52) U.S. Cl. .................... 370/310; 370/338; 370/389
(58) Field of Classification Search ................. 370/310, 370/315, 338, 351, 389, 400
See application file for complete search history.

(56) References Cited

U.S. PATENT DOCUMENTS

| | | | |
|---|---|---|---|
| 6,497,656 B1 * | 12/2002 | Evans et al. .................. 600/300 |
| 6,505,032 B1 | 1/2003 | McCorkle et al. | |
| 6,996,075 B2 * | 2/2006 | Santhoff et al. ............. 370/310 |
| 7,027,425 B1 * | 4/2006 | Fullerton et al. ............ 370/338 |
| 7,251,233 B2 * | 7/2007 | Wood .......................... 370/338 |
| 7,269,198 B1 * | 9/2007 | Elliott et al. ................. 375/130 |

(Continued)

FOREIGN PATENT DOCUMENTS

WO    WO 0193520    12/2001

(Continued)

OTHER PUBLICATIONS

Fontana R, "Recent advances in ultra wideband communications systems," 2002 IEEE Conference on Ultra Wideband Systems and Technologies, pp. 129-133.

(Continued)

*Primary Examiner*—Min Jung
(74) *Attorney, Agent, or Firm*—Van Pelt, Yi & James LLP

(57) ABSTRACT

This invention generally relates to networks of communications devices, in particular ultra wideband (UWB) communications devices. An ultra-wideband (UWB) network comprising a plurality of UWB devices each forming a node of said network, pairs of said UWB devices being configured for communication with one another using one of a plurality of UWB channels, each said UWB device comprising a UWB transceiver for bidirectional communication over one or more of said UWB channels with at least one other of said UWB devices; and a device controller coupled to said UWB transceiver, said controller being configured to determine a said UWB channel for use in establishing a communication link with each other UWB device; whereby said network is configured for automatic construction of a set of communications links between said nodes of said network.

13 Claims, 16 Drawing Sheets

U.S. PATENT DOCUMENTS

| | | | |
|---|---|---|---|
| 2002/0172262 A1 | 11/2002 | Sugaya et al. | |
| 2003/0058826 A1 | 3/2003 | Shearer | |
| 2003/0164794 A1* | 9/2003 | Haynes et al. | 342/353 |
| 2004/0131025 A1 | 7/2004 | Dohler et al. | |
| 2004/0190447 A1* | 9/2004 | Dacosta | 370/229 |
| 2005/0288031 A1* | 12/2005 | Davis et al. | 455/452.1 |
| 2008/0056332 A1* | 3/2008 | Lakkis | 375/130 |
| 2008/0163024 A1* | 7/2008 | Lakkis | 714/752 |

FOREIGN PATENT DOCUMENTS

| | | |
|---|---|---|
| WO | WO 03003672 | 1/2003 |
| WO | WO 03/023992 | 3/2003 |
| WO | WO 03023992 | 3/2003 |
| WO | WO 2004038958 | 5/2004 |
| WO | WO 2004062305 | 7/2004 |

OTHER PUBLICATIONS

Cuomo F., "Radio resource sharing for ad hoc networking with UWB," IEEE Journal on Selected Areas in Communications, Dec. 2002, vol. 20, No. 9, pp. 1722-1732.

Baldi P., "Modeling and optimizations of UWB communications networks through a flexible cost function," IEEE Journal on Selected Areas in Communications, Dec. 2002, vol. 20, No. 9, pp. 1733-1744. Internet site: http://moment.cs.ucsb.edu/AODV/aodv.html, Jan. 13, 2005.

Chakeres et al., "AODV Routing Protocol Implementation Design," Proceedings of the International Workshop on Wireless Ad Hoc Networking (WWAN), Tokyo, Japan, Mar. 2004.

Das et al., "Performance comparison of two on-demand routing protocols for Ad hoc Networks," IEEE Personal Communications Magazine special issue on Ad hoc Networking, Feb. 2001, p. 16-28.

Perkins et al., "Ad Hoc On Demand Distance Vector (AODV) Routing," IETF Internet draft, draft-perkins-manet-aodvbis-00.txt, Oct. 2003 (Work in Progress).

Perkins et al., "Ad Hoc On Demand Distance Vector (AODV) Routing," IETF RFC 3561.

Perkins et al., "Ad Hoc On Demand Distance Vector (AODV) routing for Ipv6," IETF Internet draft, draft-ietf-manet-aodv6-01.txt, Nov. 2000 (Work in Progress).

Belding-Royer et al., "Global Connectivity for IPv4 Mobile Ad hoc Networks," IETF Internet Draft, draft-royer-manet-globalv4-00.txt, Nov. 2001 (Work in Progress).

Wakikawa et al., "Global Connectivity of IPv6 Mobile Ad hoc Networks," IETF Internet Draft, draft-wakikawa-manet-globalv6-00.txt, Nov. 2001 (Work in Progress).

Perkins et al., "IP Address Autoconfiguration for Ad Hoc Networks draft-ietf-manet-autoconf-01.txt", Mobile Ad Hoc Networking Working Group, Internet Draft, Nov. 2001 (Work in Progress).

Perkins et al., "IP Flooding in Ad hoc Mobile Networks," IETF Internet Draft, draft-ietf-manet-bcast-02.txt, Nov. 2001 (Work in Progress).

Zapata et al., "Secure Ad hoc On-Demand Distance Vector (SAODV) Routing," IETF Internet Draft, draft-guerrrero-manet-saodv-00.txt, Aug. 2001 (Work in Progress).

Perkins et al., "Ad Hoc On Demand Distance Vector (AODV) Routing draft-ietf-manet-aodv-01.txt," Aug. 10, 1998.

Fontana R, 2002 IEEE Conference on Ultra Wideband Systems and Technologies, p. 129-133, "Recent Advances in Ultra Wideband Communications Systems".

IEEE Journal on Selected Areas in Communications, vol. 20, No. 9, Dec. 2002, Cuomo F., "Radio Resource Sharing for Ad Hoc Networking With UWB", p. 1722-1732.

IEEE Journal on Selected Areas in Communications, vol. 20, No. 9, Dec. 2002, Baldi P., "Modeling and Optimization of UWB Communication Network Through a Flexible Cost Function", p. 1733-1744.

* cited by examiner

COMMUNICATIONS SYSTEMS AND METHODS

This invention generally relates to networks of communications devices, in particular ultra wideband (UWB) communications devices.

Techniques for UWB communication developed from radar and other military applications, and pioneering work was carried out by Dr G. F. Ross, as described in U.S. Pat. No. 3,728,632. Ultra-wideband communications systems employ very short pulses of electromagnetic radiation (impulses) with short rise and fall times, resulting in a spectrum with a very wide bandwidth. Some systems employ direct excitation of an antenna with such a pulse which then radiates with its characteristic impulse or step response (depending upon the excitation). Such systems are referred to as "carrier free" since the resulting rf emission lacks any well-defined carrier frequency. However other UWB systems radiate one or a few cycles of a high frequency carrier and thus it is possible to define a meaningful centre frequency and/or phase despite the large signal bandwidth. The US Federal Communications Commission (FCC) defines UWB as a −10 dB bandwidth of at least 25% of a centre (or average) frequency or a bandwidth of at least 1.5 GHz; the US DARPA definition is similar but refers to a −20 dB bandwidth. Such formal definitions are useful and clearly differentiates UWB systems from conventional narrow and wideband systems but the techniques described in this specification are not limited to systems falling within this precise definition and may be employed with similar systems employing very short pulses of electromagnetic radiation.

UWB communications systems have a number of advantages over conventional systems. Broadly speaking, the very large bandwidth facilitates very high data rate communications and since pulses of radiation are employed the average transmit power (and also power consumption) may be kept low even though the power in each pulse may be relatively large. Also, since the power in each pulse is spread over a large bandwidth the power per unit frequency may be very low indeed, allowing UWB systems to coexist with other spectrum users and, in military applications, providing a low probability of intercept. The short pulses also make UWB communications systems relatively unsusceptible to multipath effects since multiple reflections can in general be resolved. Finally UWB systems lend themselves to a substantially all-digital implementation, with consequent cost savings and other advantages.

FIG. 1a shows a typical UWB transceiver 100. This comprises an transmit/receive antenna 102 with a characteristic impulse response indicated by bandpass filter (BPF) 104 (although in some instances a bandpass filter may be explicitly included), couples to a transmit/receive switch 106.

The transmit chain comprises an impulse generator 108 modulatable by a baseband transmit data input 110, and an antenna driver 112. The driver may be omitted since only a small output voltage swing is generally required. One of a number of modulation techniques may be employed, typically either OOK (on-off keying i.e. transmitting or not transmitting a pulse), M-ary amplitude shift keying (pulse amplitude modulation), or PPM (pulse position modulation i.e. dithering the pulse position). Typically the transmitted pulse has a duration of <1 ns and may have a bandwidth of the order of gigahertz.

The receive chain typically comprises a low noise amplifier (LNA) and automatic gain control (AGC) stage 114 followed by a correlator or matched filter (MF) 116, matched to the received pulse shape so that it outputs an impulse when presented with rf energy having the correct (matching) pulse shape. The output of MF 116 is generally digitised by an analogue-to-digital convertor (ADC) 118 and then presented to a (digital or software-based) variable gain threshold circuit 120, the output of which comprises the received data. The skilled person will understand that forward error correction (FEC) such as block error coding and other baseband processing may also be employed, but such techniques are well-known and conventional and hence these is omitted for clarity.

FIG. 1b shows one example of a carrier-based UWB transmitter 122, as described in more detail in U.S. Pat. No. 6,026,125 (hereby incorporated by reference). This form of transmitter allows the UWB transmission centre frequency and bandwidth to be controlled and, because it is carrier-based, allows the use of frequency and phase as well as amplitude and position modulation. Thus, for example, QAM (quadrature amplitude modulation) or M-ary PSK (phase shift keying) may be employed.

Referring to FIG. 1b, an oscillator 124 generates a high frequency carrier which is gated by a mixer 126 which, in effect, acts as a high speed switch. A second input to the mixer is provided by an impulse generator 128, filtered by an (optional) bandpass filter 130. The amplitude of the filtered impulse determines the time for which the mixer diodes are forward biased and hence the effective pulse width and bandwidth of the UWB signal at the output of the mixer. The bandwidth of the UWB signal is similarly also determined by the bandwidth of filter 130. The centre frequency and instantaneous phase of the UWB signal is determined by oscillator 124, and may be modulated by a data input 132. An example of a transmitter with a centre frequency of 1.5 GHz and a bandwidth of 400 MHz is described in U.S. Pat. No. 6,026,125. Pulse to pulse coherency can be achieved by phase locking the impulse generator to the oscillator.

The output of mixer 126 is processed by a bandpass filter 134 to reject out-of-band frequencies and undesirable mixer products, optionally attenuated by a digitally controlled rf attenuator 136 to allow additional amplitude modulation, and then passed to a wideband power amplifier 138 such as a MMIC (monolithic microwave integrated circuit), and transmit antenna 140. The power amplifier may be gated on and off in synchrony with the impulses from generator 128, as described in U.S.'125, to reduce power consumption.

FIG. 1c shows a similar transmitter to that of FIG. 1b, in which like elements have like reference numerals. The transmitter of FIG. 1c is, broadly speaking, a special case of the transmitter of FIG. 1b in which the oscillator frequency has been set to zero. The output of oscillator 124 of FIG. 1b is effectively a dc level which serves to keep mixer 126 always on, so these elements are omitted (and the impulse generator or its output is modulated).

FIG. 1d shows an alternative carrier-based UWB transmitter 142, also described in U.S. Pat. No. 6,026,125. Again like elements to those of FIG. 1b are shown by like reference numerals.

In the arrangement of FIG. 1d a time gating circuit 144 gates the output of oscillator 124 under control of a timing signal 146. The pulse width of this timing signal determines the instantaneous UWB signal bandwidth. Thus the transmitted signal UWB bandwidth may be adjusted by adjusting the width of this pulse.

Ultra-wideband receivers suitable for use with the UWB transmitters of FIGS. 1b to 1d are described in U.S. Pat. No. 5,901,172. These receivers use tunnel diode-based detectors to enable single pulse detection at high speeds (several megabits per second) with reduced vulnerability to in-band interference. Broadly speaking a tunnel diode is switched between active and inactive modes, charge stored in the diode being discharged during its inactive mode. The tunnel diode acts, in effect, as a time-gated matched filter, and the correlation operation is synchronised to the incoming pulses.

FIG. 1e shows another example of a known UWB transmitter 148, as described for example in U.S. Pat. No. 6,304,623 (hereby incorporated by reference). In FIG. 1e a pulser 150 generates an rf pulse for transmission by antenna 152 under control of a timing signal 154 provided by a precision timing generator 156, itself controlled by a stable timebase 158. A code generator 160 receives a reference clock from the timing generator and provides pseudo-random time offset commands to the timing generator for dithering the transmitter pulse positions. This has the effect of spreading and flattening the comb-like spectrum which would otherwise be produced by regular, narrow pulses (in some systems amplitude modulation may be employed for a similar effect).

FIG. 1f shows a corresponding receiver 162, also described in U.S. '623. This uses a similar timing generator 164, timebase 166 and code generator 168 (generating the same pseudo-random sequence), but the timebase 166 is locked to the received signal by a tracking loop filter 170. The timing signal output of timing generator 164 drives a template generator 172 which outputs a template signal matching the transmitted UWB signal received by a receive antenna 174. A correlator/sampler 176 and accumulator 178 samples and correlates the received signal with the template, integrating over an aperture time of the correlator to produce an output which at the end of an integration cycle is compared with a reference by a detector 180 to determine whether a one or a zero has been received.

FIG. 1g shows another UWB transceiver 182 employing spread spectrum-type coding techniques. A similar transceiver is described in more detail in U.S. Pat. No. 6,400,754 the contents of which are hereby explicitly incorporated by reference.

In FIG. 1g a receive antenna 184 and low noise amplifier 186 provide one input to a time-integrating correlator 188. A second input to the correlator is provided by a code sequence generator 190 which generates a spread spectrum-type code such as a Kasami code, that is a code with a high auto-correlation coefficient from a family of codes with no low cross-correlation coefficients. Correlator 188 multiplies the analogue input signal by the reference code and integrates over a code sequence period and in U.S. '754 is a matched filter with a plurality of phases representing different time alignments of the input signal and reference code. The correlator output is digitised by analogue-to-digital converter 192 which provides an output to a bus 194 controlled by a processor 196 with memory 198 the code sequence generator 190 is driven by a crystal oscillator driven flock 200 a transmit antenna driver 202 receives data from bus 194 which is multiplied by a code sequence from generator 190 and transmitted from transmit antenna 204. In operation coded sequences of impulse doublets are received and transmitted, in one arrangement each bit comprising a 1023-chip sequence of 10 ns chips, thus having a duration of 10 µs and providing 30 dB processing gain. Shorter spreading sequences and/or faster clocks may be employed for higher bit rates.

The transceiver described in U.S. '754 uses a modification of a frequency-independent current-mode shielded loop antenna (as described in U.S. Pat. No. 4,506,267) comprising a flat rectangular conducting plate. This antenna is referred to as a large-current radiator (LCR) antenna and when driven by a current it radiates outwards on the surface of the plate.

FIG. 1h shows a driver circuit 206 for such an LCR transmit antenna 208. The antenna is driven by an H-bridge comprising four MOSFETs 210 controlled by left (L) and right (R) control lines 212, 214. By toggling line 214 high then low whilst maintaining line 214 low an impulse doublet (that is a pair of impulses of opposite polarity) of a first polarity is transmitted, and by toggling line 212 high then low whilst holding line 214 low an impulse doublet of opposite polarity is radiated. The antenna only radiates whilst the current through it changes, and transmits a single gaussain impulse on each transition.

FIGS. 2a to 2h show examples UWB waveforms. FIG. 2a shows a typical output waveform of a UWB impulse transmitter, and FIG. 1b shows the power spectrum of the waveform of FIG. 2a. FIG. 2c shows a wavelet pulse (which when shortened becomes a monocycle) as might be radiated from one of the transmitters of FIGS. 1b to 1d. FIG. 2d shows the power spectrum of FIG. 2c. FIG. 2e shows an impulse doublet and FIG. 2f the power spectrum of the doublet of FIG. 2e. It can be seen that the spectrum of FIG. 2f comprises a comb with a spacing (in frequency) determined by the spacing (in time) of the impulses of the doublet and an overall bandwidth determined by the width of each impulse. It can also be appreciated from FIGS. 2e and 2f that dithering the pulse positions will tend to reduce the nulls of the comb spectrum. FIG. 2g shows examples of basis impulse doublet waveforms for a logic 0 and a logic 1. FIG. 2h shows an example of a TDMA UWB transmission such as might be radiated from the transceiver of FIG. 1g, in which bursts of Code Division Multiple access (CDMA)-encoded data are separated by periods of non-transmission to allow access by other devices.

Ultra wideband communications potentially offer significant advantages for wireless home networking, particularly broadband networking for audio and video entertainment devices, because of the very high data rates which are possible with UWB systems. However, UWB communications also present a number of special problems, most particularly the very low transmit power output imposed by the relevant regulatory authorities, in the US the FCC. Thus the maximum permitted power output is presently below the acceptable noise floor for unintentional emitters so that a UWB signal effectively appears merely as noise to a conventional receiver. This low power output limits the effective range of UWB communications and there is therefore a need to address this difficulty.

The applicant has recognised that there are some features of UWB communications of which advantage can be taken to address this difficulty, in particular the ability of UWB to support multiple channels. Such multiple channels may be provided in a number of ways. For example the psudo-random code used in the transmitters described above with reference to FIGS. 1e and 1g may be employed to define code division multiplexed channels in a UWB communications system. Alternatively an arrangement such as that described with reference to FIG. 1b may be employed to define a plurality of UWB bands. In another approach the relative timing of impulse doublets in an antipodeal modulation scheme may be whitened or spread using a psudo-random noise (pn) sequence code, again the pn sequence defining a channel. Provided that the impulse doublets are well separated so that the mark:space ratio is small collisions are relatively rare and generally only result in correctable single bit errors, so that multiple channels can coexist within one broad UWB band.

The ability of UWB communications to support such multiple channels facilitates the implementation of a mesh-type network in which when one UWB device is out of range with another (or at least sufficiently out of range that communication at a desired speed or with a desired quality/bit error rate) communication takes place via a third, intermediary UWB device within range of both the first and second device.

In a conventional radio network such as a network based upon a standard in the IEEE802.11 series communications between devices in the network are routed through a central base station which stores a routing table defining the topology of the entire network so that routing within the network can be controlled. However such an arrangement suffers from a number of defects in a wireless home networking environment, one important defect being the need to reconfigure the base station routing table whenever the network configuration changes. In a home environment it is undesirable to have to configure a router when the network topology changes, particularly as devices may be frequently added to or removed from the network, for example simply by switching on and off a network-enabled television or video recorder.

Furthermore the base station of such a network constitutes a single point of failure of the network, which again is undesirable. A still further difficulty is the relatively large memory and processing requirements of current network protocols—typically equivalent computing power to a 500 megahertz Pentium (trademark) is required to implement a networking protocol of this type, whereas an integrated circuit to enable wireless home networking should preferably retail in quantity for under $10.

According to a first aspect of the present invention, there is therefore provided an ultra-wideband (UWB) network comprising a plurality of UWB devices each forming a node of said network, pairs of said UWB devices being configured for communication with one another using one of a plurality of UWB channels, each said UWB device comprising a UWB transceiver for bidirectional communication over one or more of said UWB channels with at least one other of said UWB devices; and a device controller coupled to said UWB transceiver, said controller being configured to determine a said UWB channel for use in establishing a communication link with each other UWB device; whereby said network is configured for automatic construction of a set of communications links between said nodes of said network.

In embodiments employing UWB channels to establish communication links within the network this effectively allows the construction of virtual circuits within the network for communication between nodes. Thus where first and second devices are communicating via an intermediary the intermediary can communicate with the first device using a first channel and with the second device using a second channel, the intermediary acting as a store and forward node for data communicated between the first and second devices. In this way the intermediary need only be locally aware—that is no single device requires a map of the global network structure (or changes in this) because routing can be performed without such a map. Each intermediary device merely knows that incoming data on one channel (and/or port) should be forwarded on a second channel and/or port), such a list of associated channels being locally stored, for example as a table. In this way data is forwarded through the network until reaching its intended recipient.

To determine the data for these locally stored tables a broadcast protocol may be employed, for example a first device broadcasting a connection request to a second device throughout the network, the second device responding when it receives the connection request. Thus each device is preferably configured for broadcasting such a connection request, that is for forwarding the connection request to substantially all other nodes within range except that from which the request was received. The skilled person will recognise that such a technique has the potential to consume a significant fraction of the network bandwidth. However, the technique is practical in wireless home networks because such networks are generally relatively small and thus broadcast traffic, overall, need not have a great impact upon network availability.

A similar broadcast arrangement can be employed to alert devices within the network when a new device connects, for example when a network-enabled television is switched on. This initial broadcast can also be used to determine a unique identifier for the new device within the network such as a device name and/or address.

The skilled person will recognise that one characteristic of embodiments of the above described networks is their essentially local routing—messages are sent between devices along a chain of devices in whichever direction the message is sent, and thus although virtual circuits or connections are established between devices this is done dynamically, by means of local routing tables, rather than by some overall master. More particularly in embodiments a routing table entry for a device defines two connections, one for the link for the connection to the device, the second for the link for the connection from the device (for one-way communication only one of these links need be defined). Optionally the routing table may further include, for each link defined by a pair of channels for incoming and outgoing data, an identifier for the intended end recipient, although in embodiments this is not necessary because a message containing an identifier for the intended recipient is always forwarded (if it can be) unless the node is in fact the recipient.

With embodiments of the above protocols the time to set up a virtual connection is relatively small compared with typical data transmission times and it is therefore practicable to tear down and replace virtual connections when necessary, for example when a connection is found to be broken because a node in a chain is no longer responding. A virtual connection may be removed, for example, by marking an entry in a local link table as available for reuse; alternatively an entry may be deleted. Such an amendment to a local link table may be made, for example, when a message cannot be forwarded because the recipient is not found or does not respond/acknowledge receipt. In such a case a disconnect message is preferably sent back to the originator of the undelivered message so that the link table of each link in the chain can be updated to remove the connection and free up memory for reuse.

Preferably, in the above described networks two types of channel are provided, a "physical" channel such as a UWB code channel in a CDMA based scheme, and a logical channel. A plurality of logical channels may be associated with a single physical channel and the physical channel may then define a domain of the network, such as a piconet.

A single UWB channel may be used for bidirectional communication, for example by time-multiplexing, or one channel may be used for communications in a forward direction and one channel for communications in a reverse direction. It will also be appreciated that more than one channel may be employed for a link between two network nodes for increased data rates.

In a related aspect the invention provides an ultra-wideband (UWB) network comprising a plurality of UWB devices each forming a node of said network, pairs of said UWB devices being configured for communication with one another using one of a plurality of UWB channels, each said UWB device comprising a UWB transceiver for bidirectional communication over a plurality of said UWB channels with a plurality of other UWB devices; and a connection table configured to store connection data associating a first of said channels bearing incoming data with a second of said channels for use in forwarding said incoming data to another of said UWB devices.

To facilitate forwarding data in such a UWB network which, as previously mentioned, may operate at very high speeds, packet data communication is preferably employed. Broadly speaking a conventional packet structure may be used but preferably with the addition of a channel identifier to facilitate rapid processing of packets and, in particular, to facilitate rapid routing of a packet within a node, for example for forwarding.

In a further aspect, therefore, the invention provides a data packet for UWB communication between nodes of a packet data UWB network, such as a network described above, the network having a plurality of UWB channels for communication between said network nodes, said data packet including payload data and UWB channel identification data, such as a channel number, whereby a said network node receiving said data packet is able to determine a UWB channel to use when forwarding said data packet.

As previously described there are preferably two kinds of channel operating: (i) a 'UWB Code Channel' which is used to distinguish between different concurrent radio networks (piconets) along CDMA lines; and (ii) a channel or channels for logical communication flow within the network. The CDMA code may be known, in order to receive a packet, but there may be several concurrent logical channels on any given single CDMA domain, either due to a QoS (quality of service) distinction such as bandwidth or latency control, or simply because there are multiple devices sharing the same CMDA domain by means of time multiplexing. For this reason a network packet preferably includes some form of logical routing information, which may be derived, from example, from paired MAC addresses in an 802.3 style Ethernet frame or by means of a (proprietary) header word.

In a further related aspect the invention provides an ultra-wideband (UWB) device for a node of a UWB network, the device comprising an interface to a UWB transceiver for bidirectional communication over one or more UWB channels with one or more other UWB devices; and a controller coupled to said UWB transceiver interface, said controller being configured to control said UWB transceiver to communicate with said one or more other UWB devices to determine a said UWB channel to employ for communicating with each of said other UWB devices.

In another aspect the invention provides a controller for controlling a UWB device for a node of a UWB network, the UWB device including a UWB transceiver for bidirectional communication over one or more UWB channels with a plurality of other network devices, communication with at least one indirectly linked device of said other UWB devices being via an intermediary UWB device, the controller comprising an interface for said UWB transceiver; data memory for storing network communication link connection data comprising data associating each said network device with a said UWB channel; program memory storing computer program code; and a processor coupled to said interface, said data memory, and to said program memory for loading and implementing said program code; wherein said connection data for said indirectly linked UWB device comprises data associating said indirectly linked device with a channel for communicating with said intermediary device; and wherein said code comprises code to send network data to said indirectly linked device by accessing said connection data for said indirectly linked device to determine said channel associated with said intermediary device, and controlling said UWB transceiver to transmit said network data over said determined channel.

The invention further provides a controller for an ultra-wideband (UWB) network node, the controller comprising a processor having a processor control bus and a processor data bus; processor memory coupled to said processor data bus; buffer memory coupled to a second data bus; a memory access controller coupled to said second data bus and to said processor control bus; and a UWB interface for interfacing to a UWB communications device, coupled to said processor control bus and to said second data bus; and wherein said processor is master of said processor control bus and said memory access controller is master of said second data bus.

The above described architecture facilitates the rapid processing of data packets sent over the network and, in embodiments, is also relatively inexpensive to implement. Preferably a link is also provided from the processor memory to the second data bus so that data, for example header data from a packet, may be transferred to the processor memory and/or a cache. In embodiments one or more further physical network layer interfaces may be provided, also coupled to the processor control bus and to the second data bus. These may comprise, for example, a PCI (peripheral component interconnect) interface and/or an Ethernet interface and/or a further UWB interface.

In preferred embodiments of the controller the memory access controller is the sole master of the second data bus so that there is no need for arbitration on this bus. It is further preferable that the buffer memory is coupled to the second data bus via the memory access controller. In this way the memory access controller controls all access to and from the buffer memory. The memory access controller is itself under control of the processor, which preferably is the sole master of the processor control bus. This decouples data processing functions from the very rapid movement of data from the UWB interface to the buffer memory and, if necessary, out again for retransmission, and thus facilitates very high data rate data handling. In a preferred embodiment the memory access controller has one or more associated registers and is configured to store control information from packets passing through the controller in these registers for reading by the processor. This further facilitates rapid packet handling.

In another aspect the invention provides a UWB network having a mesh topology and comprising a plurality of UWB devices configured for mutual UWB communication with one another, a first of said devices being configured for communicating with a second of said devices via a third of said devices when said second device is out of range, and wherein said third device is configured to use a first UWB communication channel for communicating with said first UWB device and a second UWB communication channel for communicating with said second UWB device.

The invention further provides a method of sending data from a first data processor to a second data processor in a network of data processors having a variable network topology, said topology being defined by communications links between processors of said network, the method comprising broadcasting a connection request message from said first processor to substantially all other processors to which it is linked; receiving a connection established message from said second data processor via an intermediary processor with which said first processor is linked; and sending said data to said intermediary processor for forwarding to said second processor.

The invention further provides processor control code to implement the above described networks, devices and methods. This may comprise computer programme code in any conventional programming language such as C, assembly language or machine code, or micro code, or some other processor control code. The code may be provided on a data carrier such as a disk, CD- or DVD-ROM, programmed memory such as read-only memory (firmware), or on a data carrier such as an optical or electrical signal carrier. As the skilled person will appreciate such code may be distributed between a plurality of coupled components in communication with one another.

These and other aspects of the present invention will now be further described, by way of example only, with reference to the accompanying figures in which:

FIGS. 1a to 1h show, respectively, a typical UWB transceiver, a first example of a carrier-based UWB transmitter, a variant of this first example transmitter, a second example of a carrier-based UWB transmitter, a third example of a UWB transmitter, a receiver for the third example transmitter, a UWB transceiver employing spread spectrum techniques, and a driver circuit for a large-current radiator antenna;

Figure 1A:
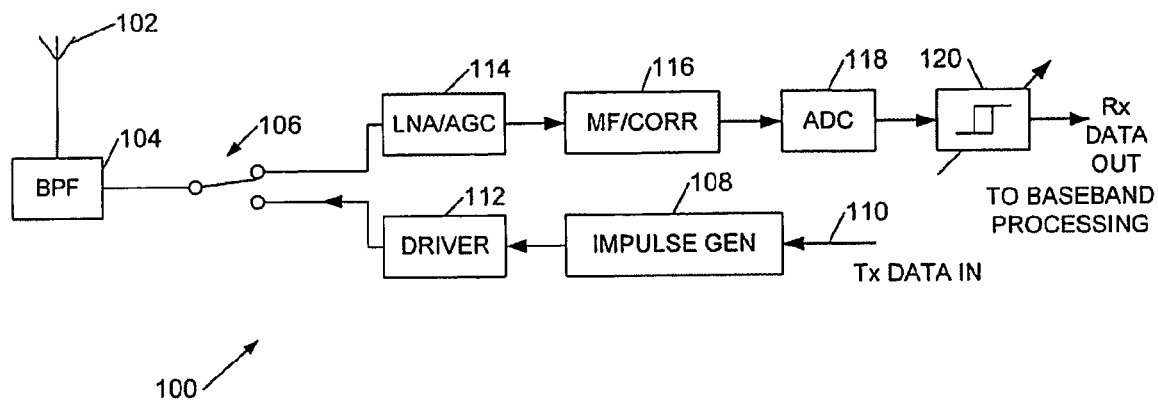
Figure 1B:
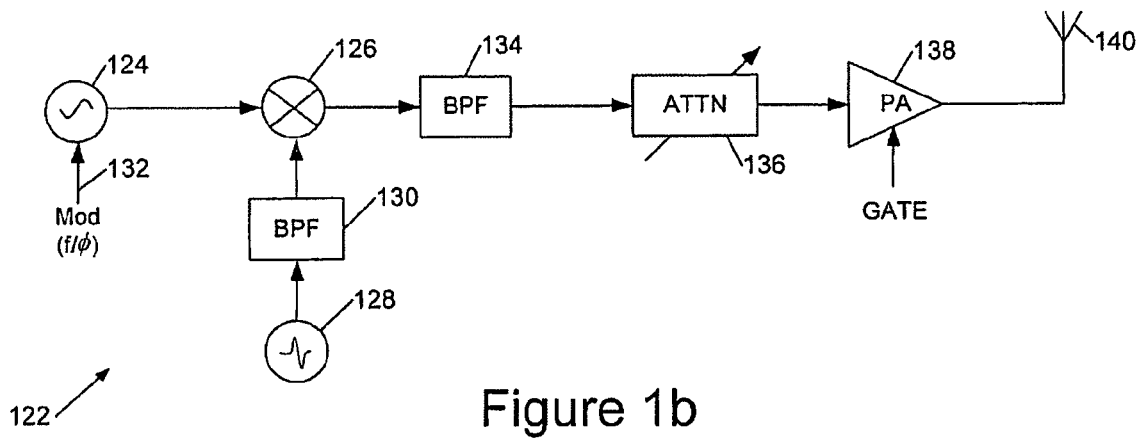
Figure 1C:
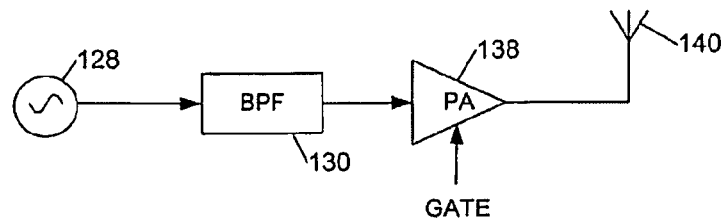
Figure 1D:
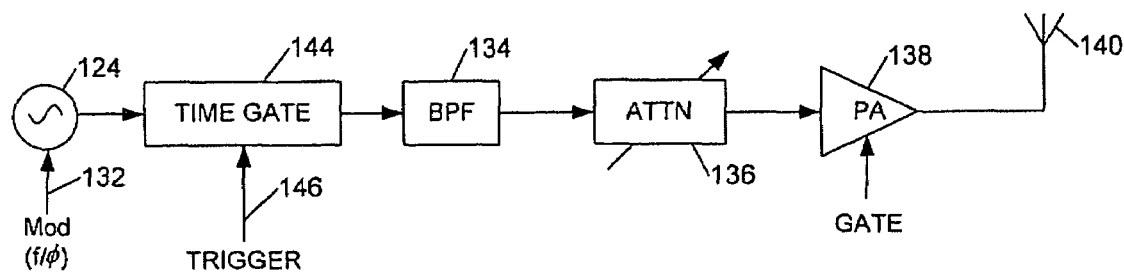
Figure 1E:
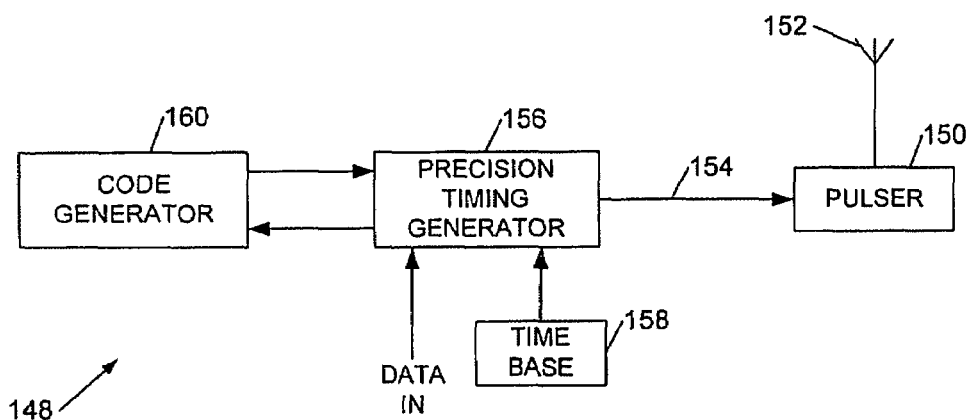
Figure 1F:
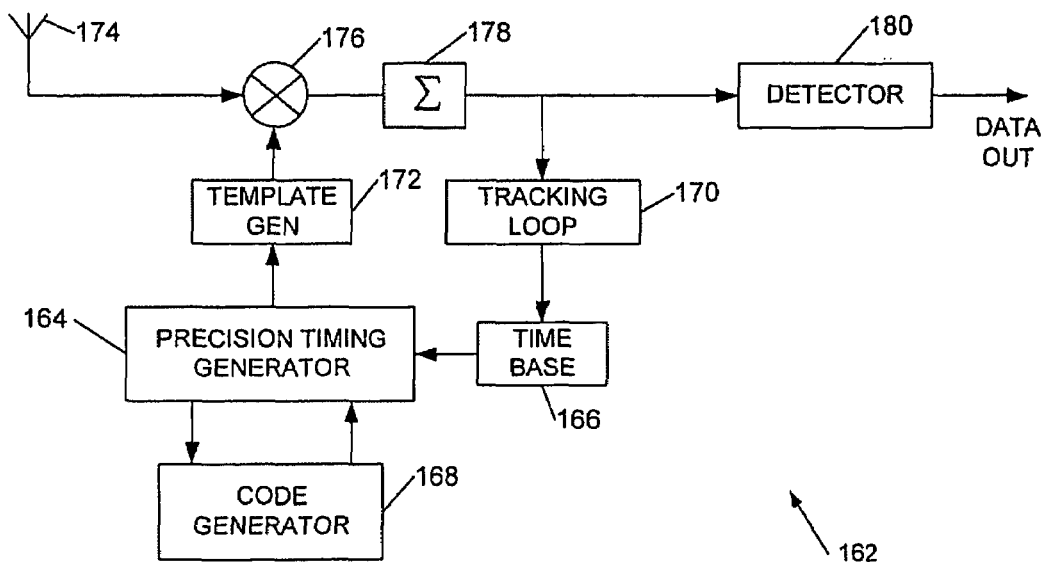
Figure 1G:
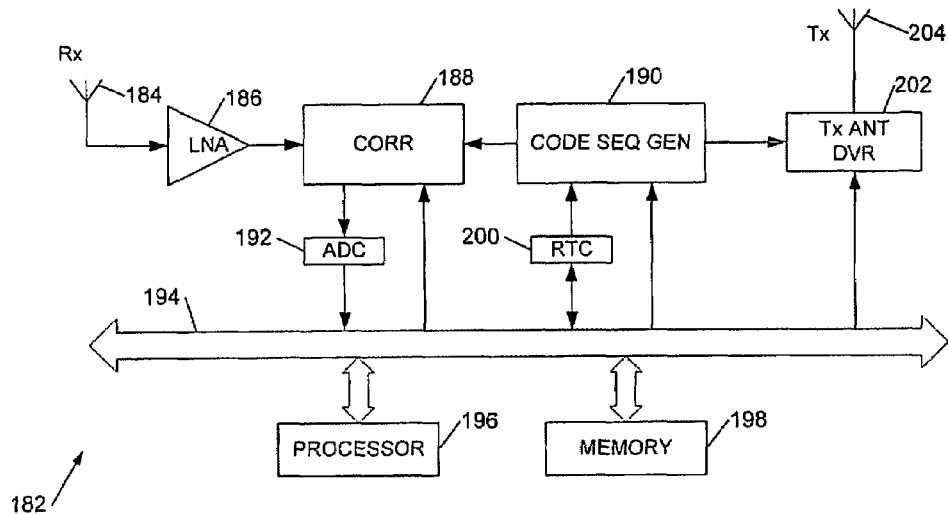
Figure 1H:
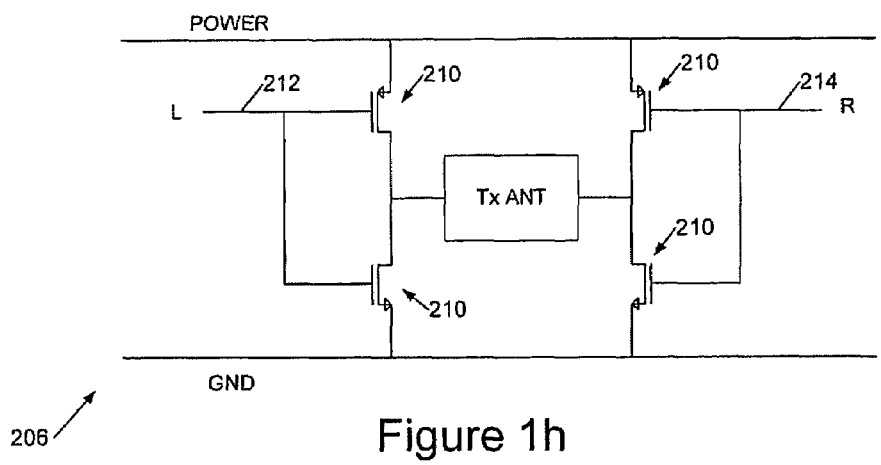
Figures 2G, 2H:
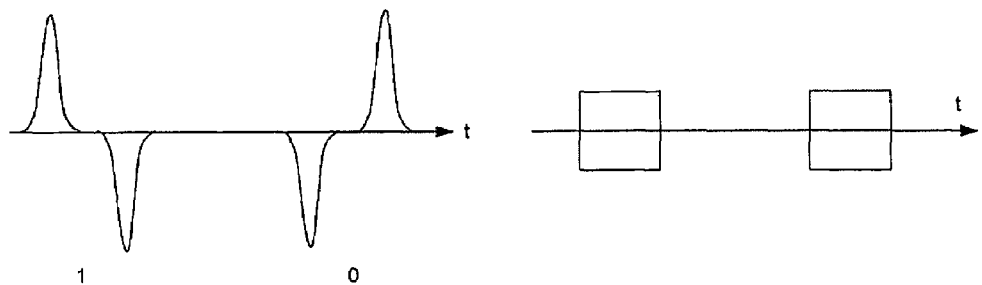
FIGS. 2a to 2h show examples of UWB waveforms.
Figure 2A:
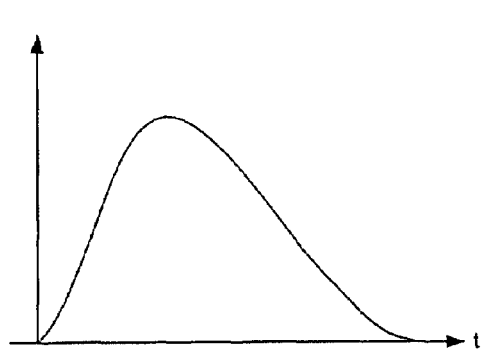
Figure 2B:
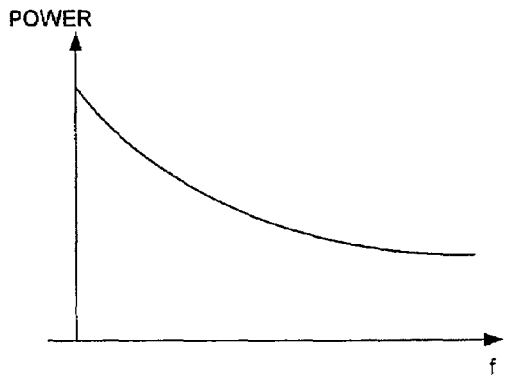
Figure 2C:
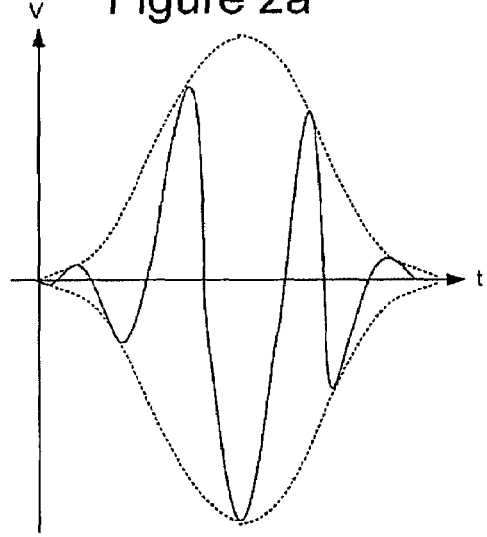
Figure 2D:
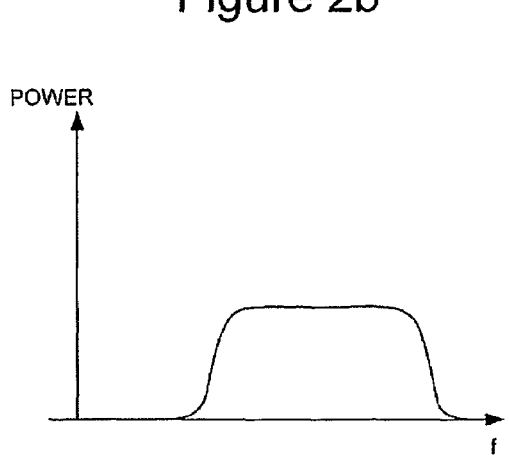
Figure 2E:
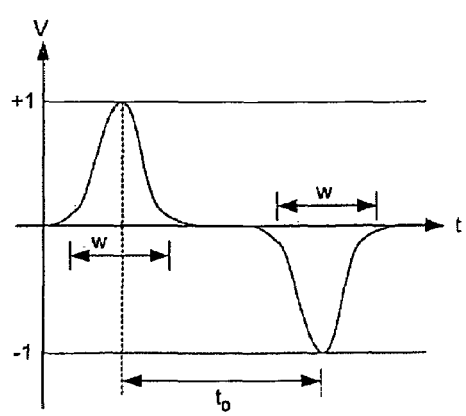
Figure 2F:
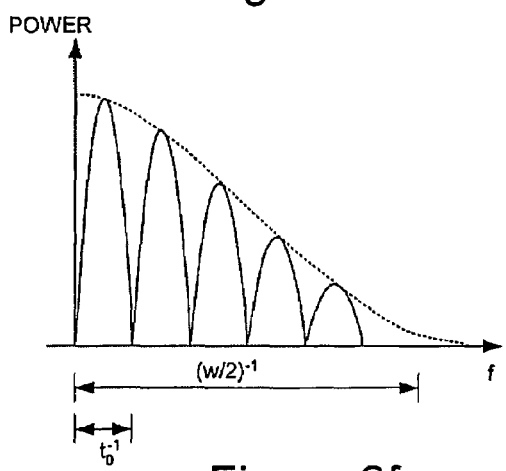
Figure 3A:
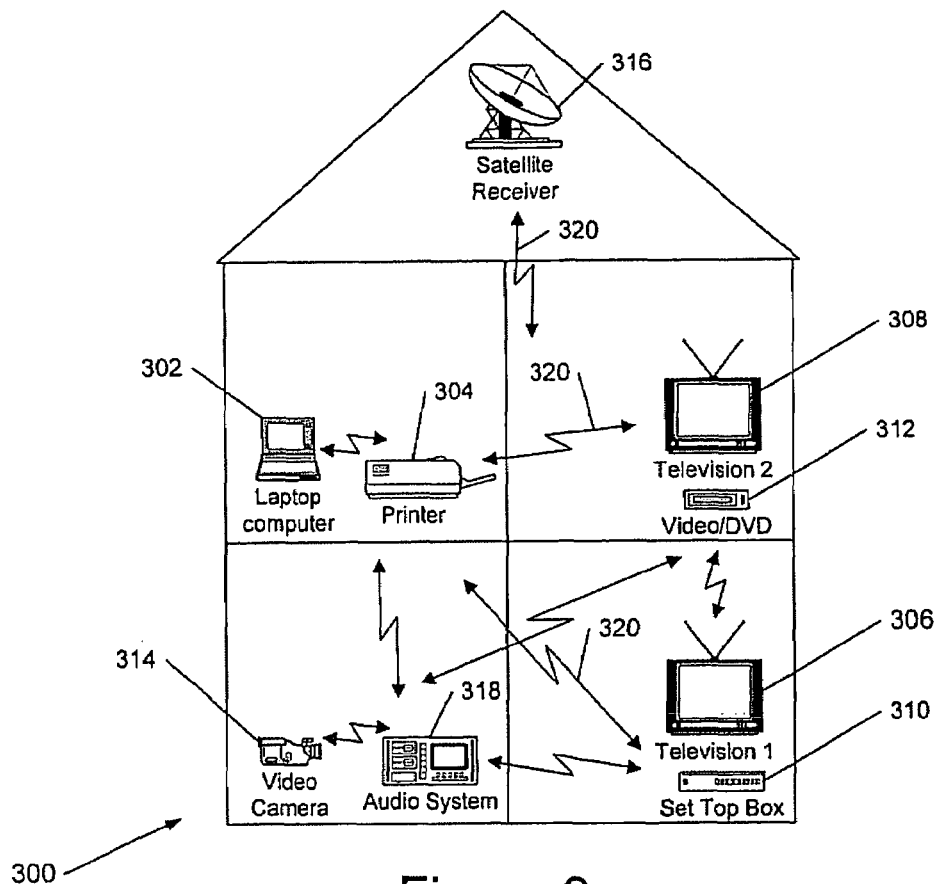
FIGS. 3a and 3b show, respectively, an example of a UWB home wireless network, and a schematic diagram of a UWB wireless network with a mesh topology.

Referring to FIG. 3a, this shows an example of a UWB wireless home network 300 comprising a plurality of consumer electronic devices each of which is provided with a UWB transceiver and an associated controller to enable it to act as a node on the UWB network. In the illustrated example nodes on the network include a laptop computer 302 and printer 304, first and second televisions 306, 308, a set top box 310 and a video/DVD player 312, a video camera 314, a satellite receiver 316, and an audio system 318. As schematically illustrated by communication paths 320 these devices are in UWB communication with one another although in general not every device will be in communication with every other device. For example the satellite receiver 316 may be located in the loft of a building and may therefore only be able to communicate with UWB-enabled devices in upstairs rooms.

Figure 3B:
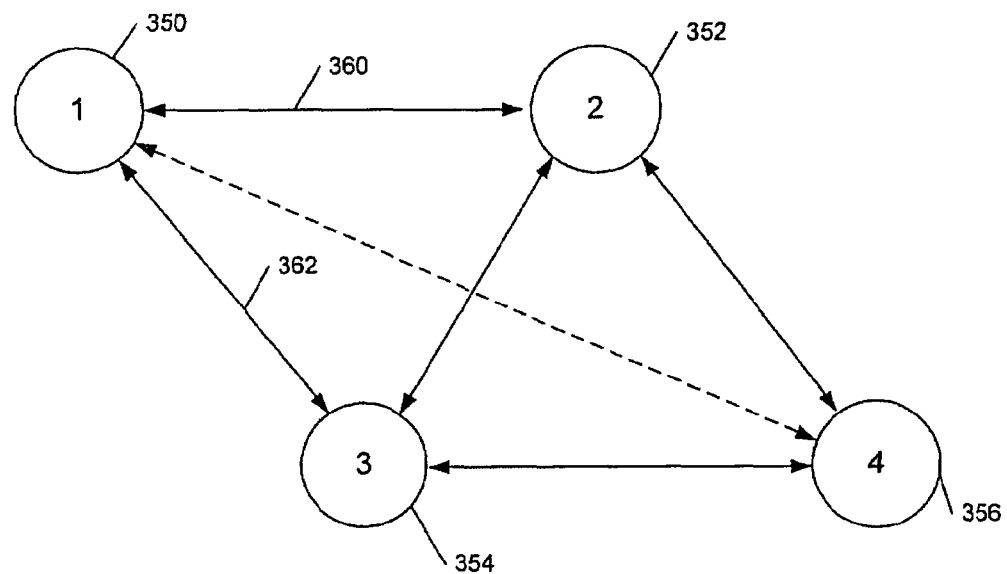

FIG. 3b shows a simplified schematic diagram of a UWB home wireless network such as that shown in FIG. 3a. In the example of FIG. 3b the network has four nodes 350, 352, 354, 356 defining a mesh topology. Each node is in communication with each other node as illustrated by the solid lines connecting the nodes, except for nodes 350 and 356 which are out of range of one another, as indicated by the dashed line connecting these nodes. In this context it is noted that there may not be a sharply defined range limit for communication between two nodes, in which case 'range' may be taken to mean range providing an acceptable data rate and/or error rate. Thus in FIG. 3b if nodes 350 and 356 wish to communicate with one another the communication must be routed via either node 352 or node 354. From FIG. 3a it will be appreciated that the topology of the network is variable since UWB network enabled devices may be physically moved between locations and/or switched on and off. Moreover at times devices may be added to or removed from the network. It is preferable that such network modifications do not require reconfiguration of the network by a user, and in particular that there is no need for configuration of one or more routers as would be the case in a traditional IP (internet protocol) network. It can further be seen that in the networks of FIGS. 3a and 3b there is no single network backbone across which traffic could be managed.

Figure 4A:
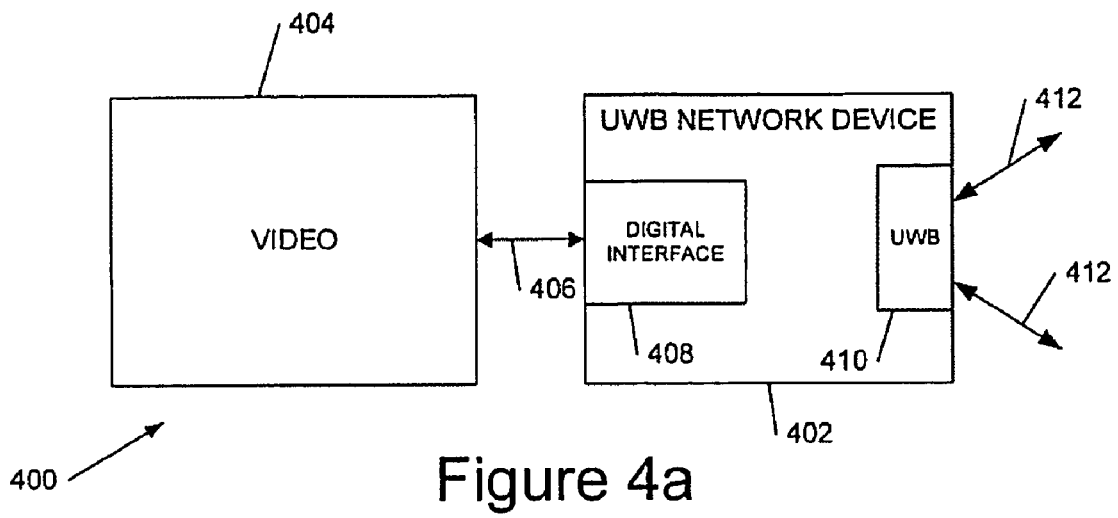
FIGS. 4a and 4b show examples of processing nodes on a UWB network.
Figure 4B:
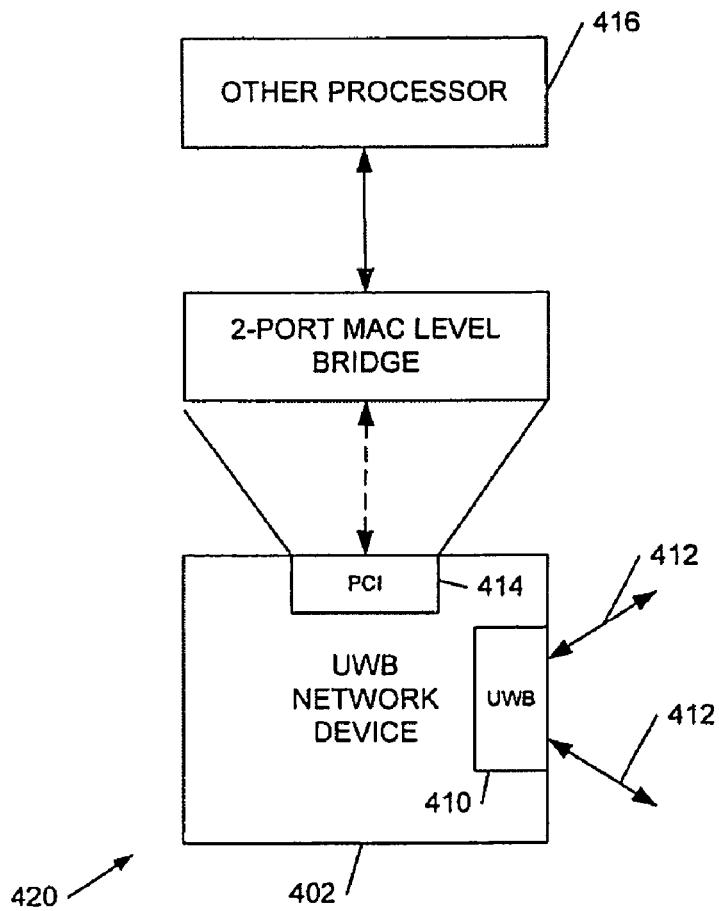

FIGS. 4a and 4b show two examples of nodes on the network of FIG. 3b. FIG. 4a shows a node 400 comprising a UWB network device 402 coupled to a video recorder/player 404 by means of a digital link 406 comprising, for example, a coaxial cable or PCI (peripheral component interconnect) connection. The network device 402 comprises a digital interface 408 for digital link 406 and a UWB transceiver 410 to provide one or more UWB communication channels 412. FIG. 4b shows another example of a node 420 in which like elements to those of FIG. 4a are indicated by like reference numerals. In the example of FIG. 4b UWB network device 402 includes a PCI interface 414 to another processor 416 such as a processor of a DVD player or an Ethernet router. In the example of FIG. 4b network device 402 implements a two port MAC (media access control) level bridge to the other processor 416 in a conventional manner.

Referring again to FIG. 3b, communication between pairs of nodes of the network, in this embodiment, takes place on different channels. Thus, for example, link 360 between nodes 350 and 352 may utilise a first UWB channel and link 362 between nodes 350 and 354 may utilise a second UWB channel. As previously mentioned this may be implemented using code division multiplexing, different ultra-wide frequency bands or in some other way. As mentioned above, in a preferred arrangement there are two kinds of channel operating: a 'UWB Code Channel' which is used to distinguish between different concurrent radio networks (piconets) using CDMA technique, and the logical communication flow channels within the network. There may be several concurrent logical channels on any given single CDMA domain, either due to a distinction on grounds of QoS (bandwidth or latency control) or simply because there are multiple devices sharing the same CMDA domain by means of time multiplexing. Hence, as described further below, data packets transmitted over the network preferably contain some form of logical routing information, which may be either derived from paired MAC addresses in an 802.3 style Ethernet frame or by means of a proprietary header word.

Broadly speaking, there are two ways to communicate between two devices. The first simply uses concurrent transmission using a different coding and/or frequency band (true parallel communication). The second uses some form of time multiplexing. This can either multiplex the physical layer (phy) between different codes/frequencies, or time multiplex different devices sharing the same code/frequency channel. Thus to communicate on two or more channels a single UWB transmitter, receiver or transceiver may be time multiplexed or a "separate" UWB transmitter/receiver/transceiver may be provided for each channel. For example a logical UWB transceiver may be provided for each parallel channel up to a maximum number of channels, each of these logical transceivers being accessed by a different port. Communication protocols for implementation on a UWB mesh network such as that shown in FIG. 3b are described later. These protocols are, however, not limited to use with networks employing UWB communication channels and may be employed with other variable topology mesh networks, for example networks employing a time multiplexed shared communication medium such as a fibre optic loop or networks employing a plurality of non-shared concurrent connections such as a plurality of Ethernet cable connections, one for each channel/link.

Figure 5A:
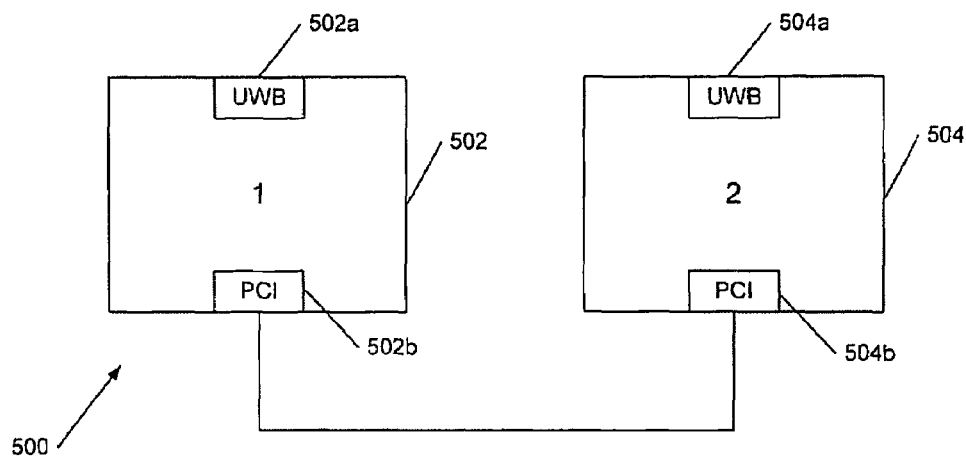
FIGS. 5a and 5b show examples of relay nodes of a UWB network.
Figure 5B:
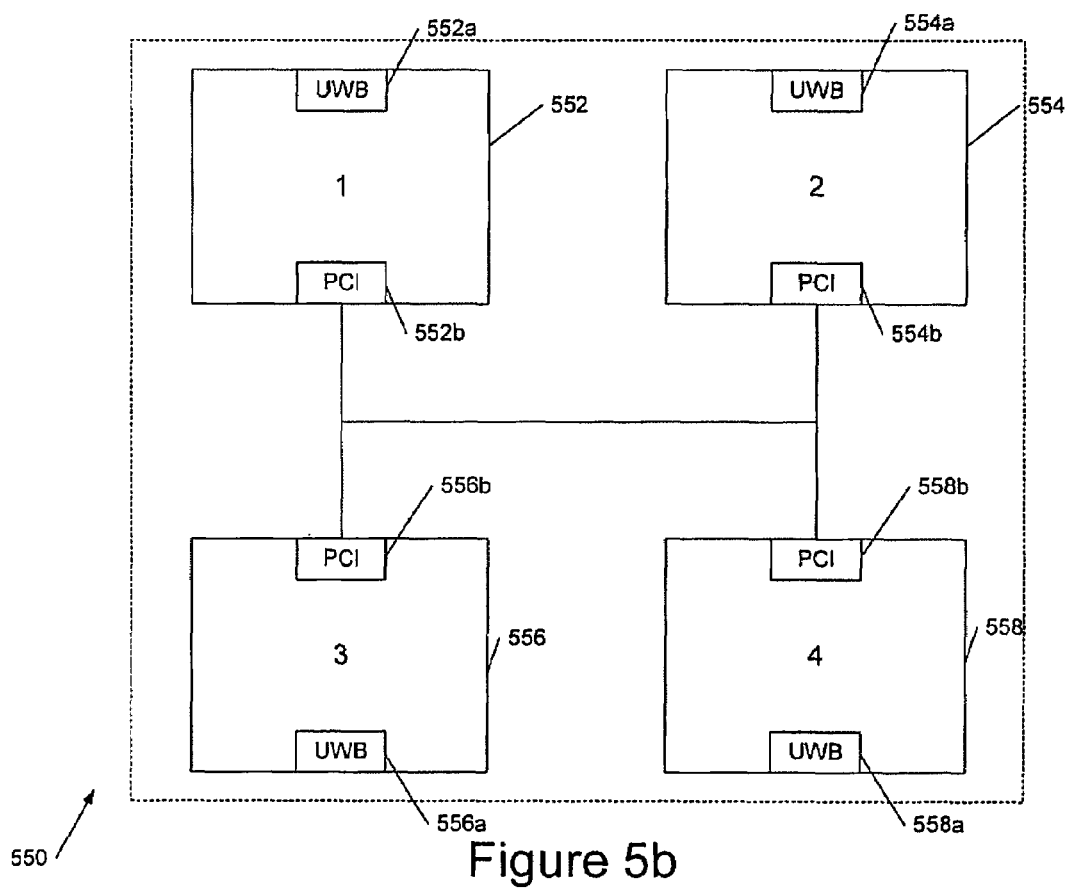

FIGS. 5a and 5b show examples of relay nodes for a UWB network such as that shown in FIG. 3b. FIG. 5a shows a relay node 500 comprising a pair of network nodes 502, 504 and FIG. 5b shows a relay node 550 comprising four network nodes 552, 554, 556, 558. Both these relay nodes operate in a broadly similar manner, and each comprise a plurality of network nodes each with a UWB transceiver 502a, 504a, 552a, 554a, 556a, 558a and a second interface 502b, 504b, 552b, 554b, 556b, 558b, in the example shown a PCI interface (although other interfaces such as Ethernet or Firewire (trademark) could be used. Conceptually each of these relay nodes comprises a grouping of a plurality of UWB network nodes which behave in the same way as nodes of the network of FIG. 3b but which in addition have a fixed, wired link between them also operating according to the UWB network protocols described later. Thus a relay node is, in effect, a conceptual grouping of nodes linked by a wired rather than a UWB connection. Thus the single link between the PCI interfaces 502b, 504b of relay node 500, and the bridge between PCI interfaces 552b, 554b, 556b, 558b of relay node 550 in effect replace UWB links in the network and may be treated as simply another link for their respective nodes 502, 504, 552, 554, 556, 558. It will be appreciated that a relay node may be placed between two nodes which would otherwise be out of range, for example between nodes 350 and 356 in FIG. 3b to act as a bridge, for example node 350 communicating with node 502 of relay 500 and node 356 communicating with node 504 of relay 500.

Communication channels may be implemented on a PCI bus using time division multiplexing, in a conventional manner. Thus, for example, for relay node 550 each of PCI interfaces 552b, 554b, 556b, 558b may act as a bus master, at any one time one acting as a bus arbiter. A PCI discovery protocol may be implemented using PCI register space, each interface exporting a block of shared memory to establish communications. A pair of circular buffers may be employed for data input and output. Such conventional techniques are well known to the skilled person; PLX Technology, Inc. of Sunnyvale, Calif., USA provide suitable PCI hardware and, InSilicon Corp. of San Jose, Calif., USA, for example, provide silicon IP blocks for implementation of PCI protocols in hardware.

Figure 6:
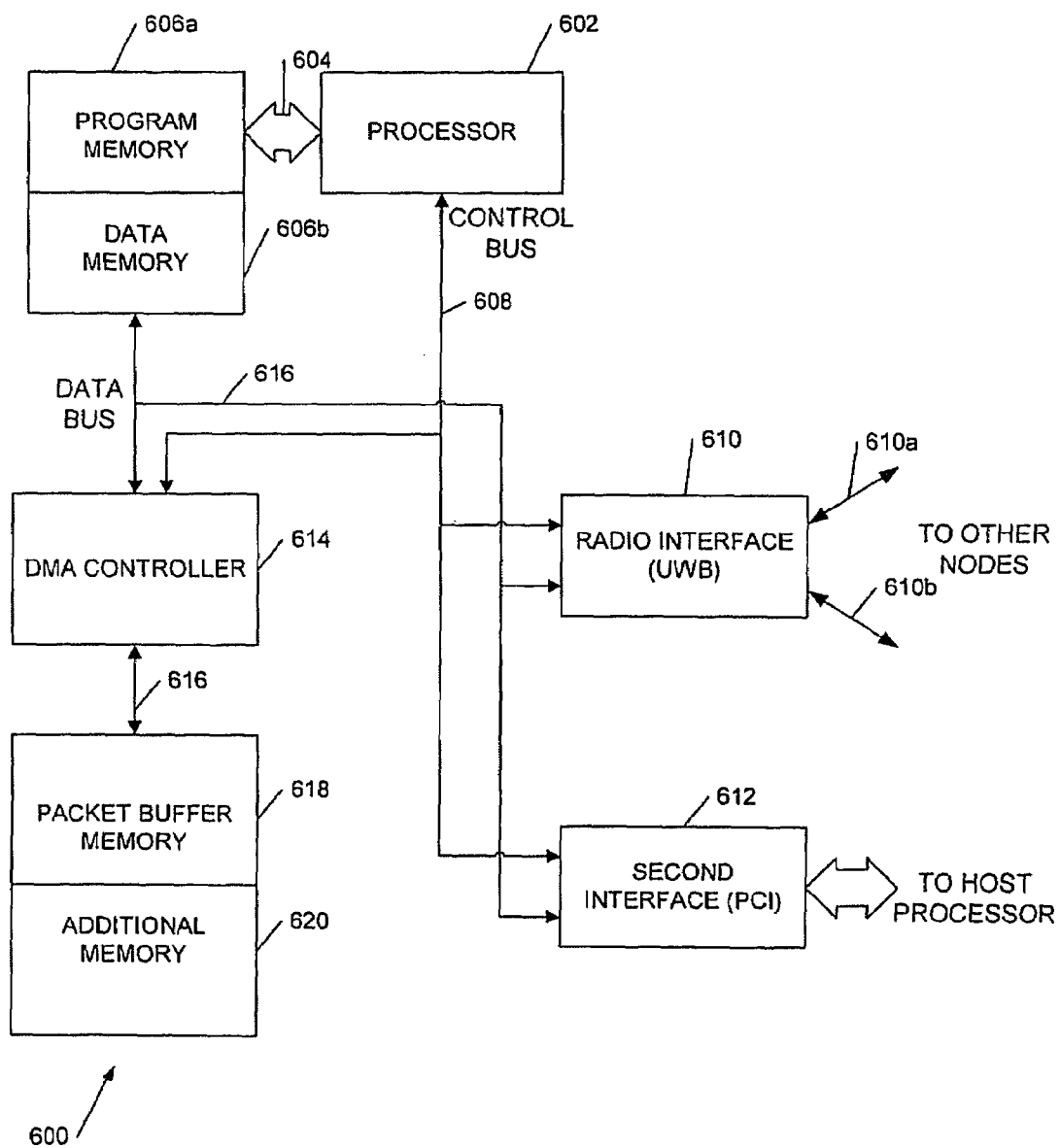
FIG. 6 shows a node architecture for a UWB network.

Referring now to FIG. 6, this shows a particularly advantageous architecture 600 of a UWB network device for the above described UWB network. The device comprises a processor 602 which has an address and data bus 604 connecting the processor to programme memory 606a and data memory 606b. The processor also has a control bus 608 for reading and writing control data from and to peripheral devices which here comprise a UWB radio interface 610, a second interface 612 to a host processor or device, and a DMA (direct memory access) controller 614. The UWB radio interface 610 provides multi channel bidirectional communications as schematically indicated by UWB links 610a, b and preferably incorporates forward error correction. The second interface 612 may comprise a PCI interface or an Ethernet interface or another UWB interface, and enables the UWB network device to be coupled to a host processor such as a TV, video, computer, set top box and the like. Apart from the data bus included with buses 604 the network device includes a second data bus 616 which is used for transporting data sent over the network. Thus data bus 616 is coupled to radio interface 610 and to second interface 612 as well as to buffer memory 618 for buffering transmitted packet data. However data bus 616 is not directly connected to the data bus of processor 602 and instead is controlled by DMA controller 614, which in preferred embodiments is the only bus master on this data bus to avoid the need for bus arbitration. Thus DMA controller 614 controls the transfer of data between radio interface 610, packet buffer memory 618 and second interface 612. Such data transfer is indirectly controlled by processor 612 via control bus 608; preferably processor 602 is the only bus master on this control bus, again so that no bus arbitration is required. Preferably data bus 616 is further coupled to the data memory 606b of processor 602 in order to allow data to be exchanged between packet buffer memory 618 and data memory 606b under control of DMA controller 614. This allows, for example, packet header data to be transferred to data memory 606 for processing by processor 602. In a preferred embodiment DMA controller 614 also has a plurality of registers accessible to the processor using control bus 608, these registers storing packet control information such as channel handle information as described further below. Optionally additional memory such as Flash memory or SDRAM may be appended to the packet buffer memory 618, and likewise accessed by DMA controller 614.

Figure 7A:
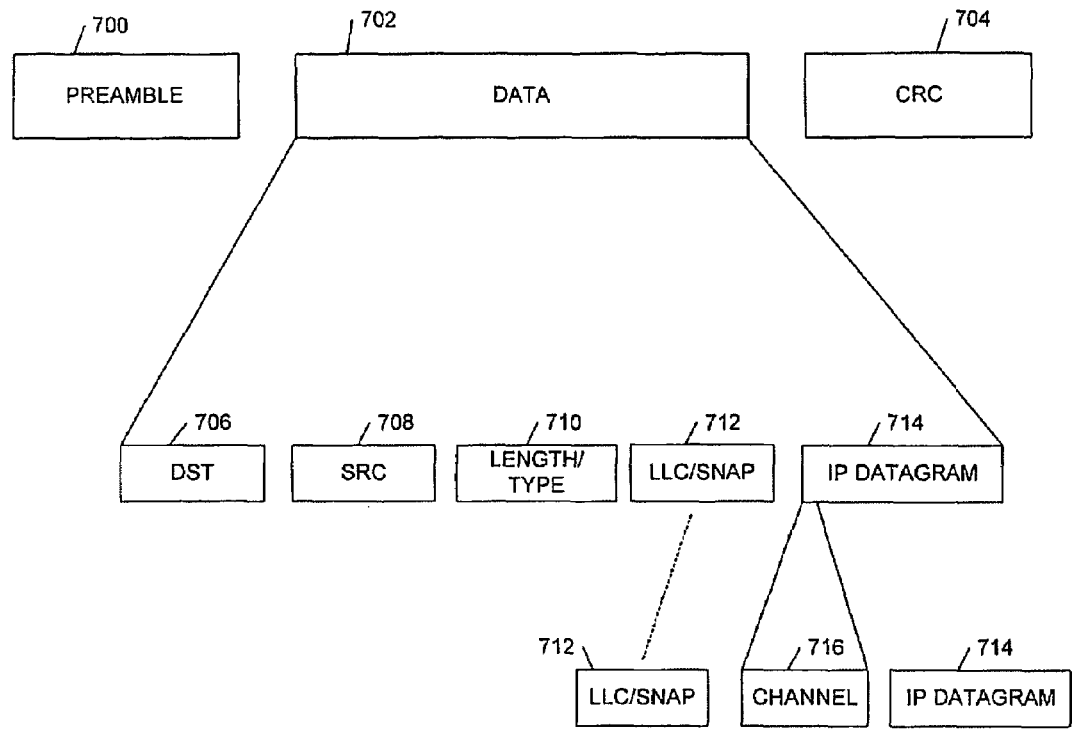
FIGS. 7a and 7b show a data packet structure for a UWB network.

FIG. 7a shows an example data packet adapted for use with the UWB network of FIG. 3b. This is broadly based upon a standard Ethernet packet, with some modifications, and therefore comprises an initial preamble 700 followed by payload data 702 and finally a cyclic redundancy cheque (CRC) 704. The payload data comprises destination 706 and source 708 addresses followed by two bytes of length/type information 710 and LLC/SNAP (link layer control—sub-network access protocol) data 712 and an IP (internet protocol) datagram 714. The payload data typically varies between 1500 bytes and 10 k bytes depending upon the speed of the interface. The LLC/SNAP fields are defined by IEEE802.2 and are used to identify a specific packet format as used by the above described UWB network. The LLC/SNAP field comprises eight bits holding a value which indicates the protocol being used which, optionally, may be registered with the IEEE.

Figure 7B:
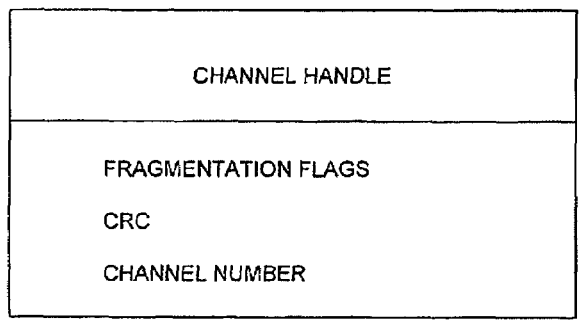

Thus the modified packet data structure includes a channel field or channel handle 716, as shown in FIG. 7b comprising packet fragmentation flags, a CRC, and a channel number or other identifier. In one embodiment the fragmentation flags comprise two bits a 'first' bit and a 'last' bit to indicate whether the data comprises the first or last portion of a packet or, if both are set, the whole of a packet; in one embodiment the channel number comprises ten bits and the channel handle four bytes. The channel number may be used to look up the channel on which a data packet was transmitted in order to determine to which destination the packet should be sent next.

Figure 8:
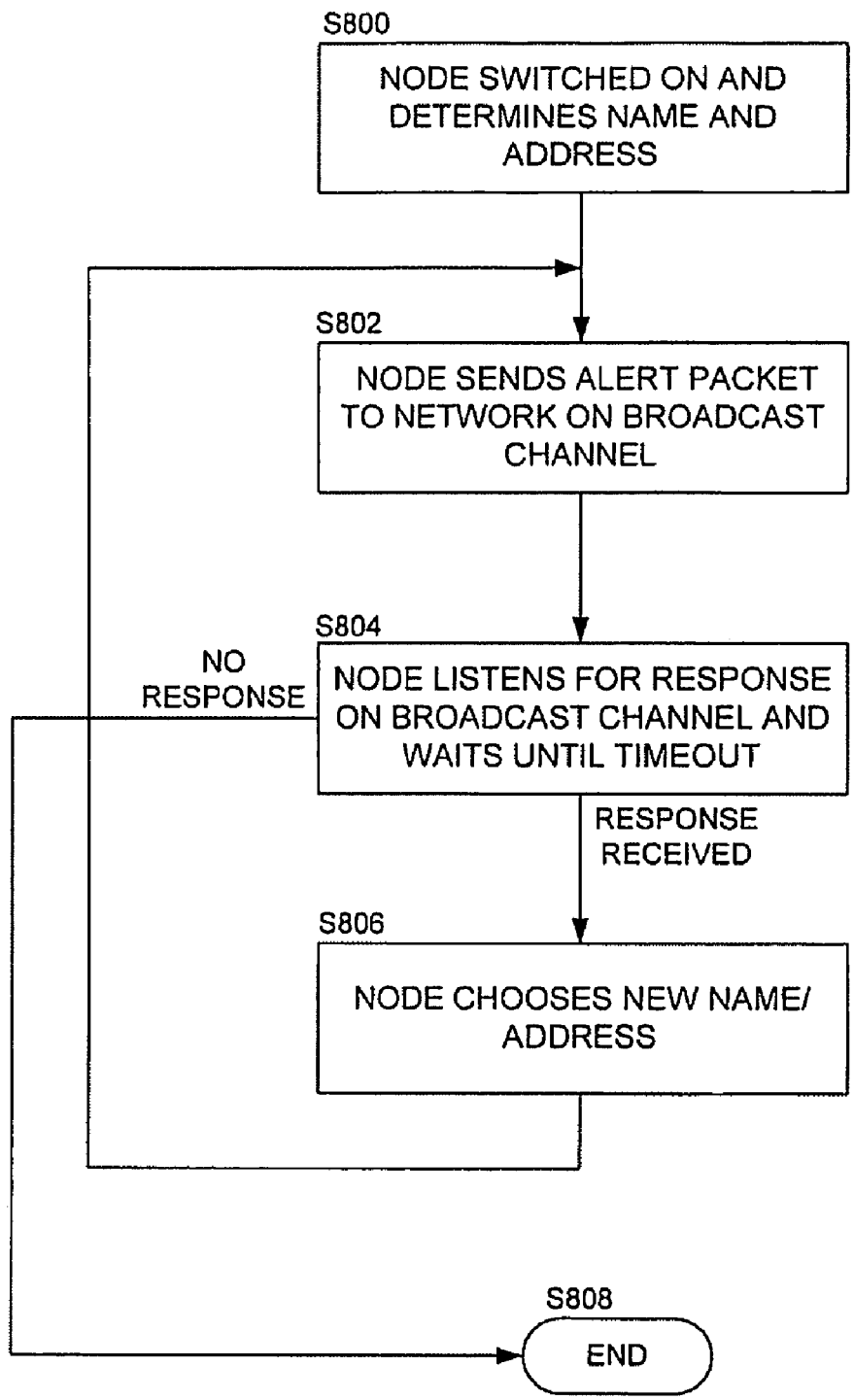
FIG. 8 shows a flow diagram of a network presence alert procedure.

The operation of an embodiment of a UWB network such as shown in FIG. 3b will now be described. Thus referring to FIG. 8 this shows the behaviour of a network node device when first switched on or otherwise initiated.

The node is switched on at step S800 and, at step S802, sends an alert packet to the network on a broadcast channel, that is on a channel which is designated as such. The alert packet comprises a name and address for the node and preferably includes a node type code. The node name may comprise a character string, for example Firewire interface 1, either chosen automatically based on pre-programmed information or information from a host to which it is connected, or determined manually by a user. The address may take any convenient form, for example it may be based on the MAC address of the network node device. The type code preferably categories the device into one of a plurality of types preferably relating to the host to which it is connected, to specify types or category of datastream the device may accept or provide. Thus type codes may specify video devices and audio devices so that a user can, for example, display a list of all video devices and their names on the network, or all audio devices, or all computing devices or other devices. The broadcast channel protocol sends an alert packet received from a node to all the ports/nodes to which it is connected except that from which it was received. A hop count is also associated with the alert packet and this is decremented each time the packet is forwarded to prevent infinite loops within the network.

At step S804 the node then listens for a response to the alert packet on the broadcast channel until a predetermined interval has expired. If no response is received the procedure ends at step S808. However a response is taken to indicate that the chosen name and/or address is in use, in which case the node selects a new name and/or address at step S806 and loops back to step S802 to rebroadcast this new name and/or address. Since the number of devices in the UWB network is generally relatively small a new name/address may be generated, for example, by appending an integer or character sequence to an existing name and/or address. The response to the alert packet may take a similar format to the alert packet but with the source and destination fields appropriate to the originator of the response.

To give a more detailed illustration, when deriving the base name, the device manufacturer will most likely have configured a suitable string in the firmware (eg: "LG-VideoPlayer210x"). Since most homes will only have one of most device types, the names will be sufficiently unique to identify the device. When there is a conflict, the approach of simply appending a number is still relatively understandable (eg: "LG-VideoPlayer210x-3"). There is a potential race condition whereby the order of startup of devices may result in different naming being applied in such cases. To avoid this, the devices may choose to record the first successfully stored name in non-volatile memory (eg: FLASH) and then re-use this automatically as the initial test name on the next startup. Furthermore, a given manufacturer may also choose to use logical names to distinguish devices rather than numbers, making association easier for the user (eg: "pda-red", "pda-green", rather than "pda-1". "pda-2". Such measures help to provide stability in the association of names and devices to the user.

Figure 9:
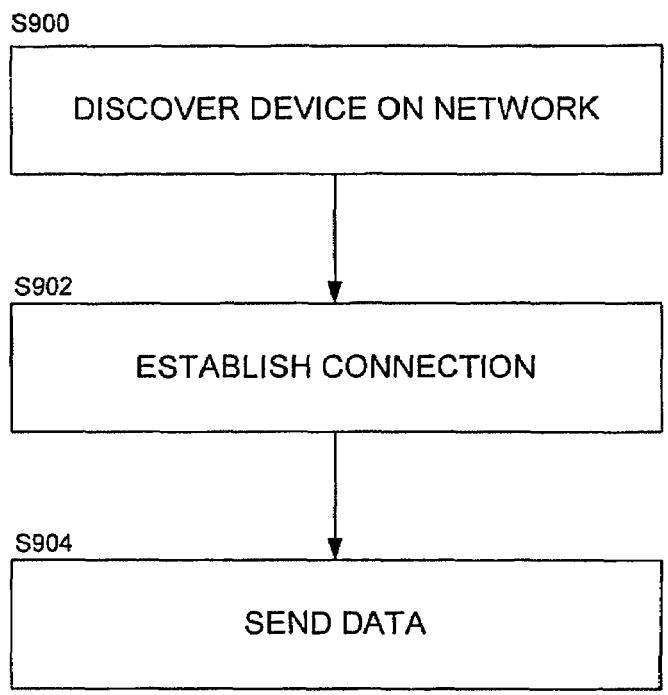
FIG. 9 shows an outline flow diagram of a send data procedure.

FIG. 9 shows in broad outline the steps involved in sending data from one node of the network to another. Initially the sending node attempts to discover the destination device on the network (step S900), if the sending node is not already aware of the device, for example from a previous alert packet. The sending node then establishes a connection with the receiving node along a chain of nodes through the network (S902) and then sends the data to the receiving node (step S904).

Figure 10:
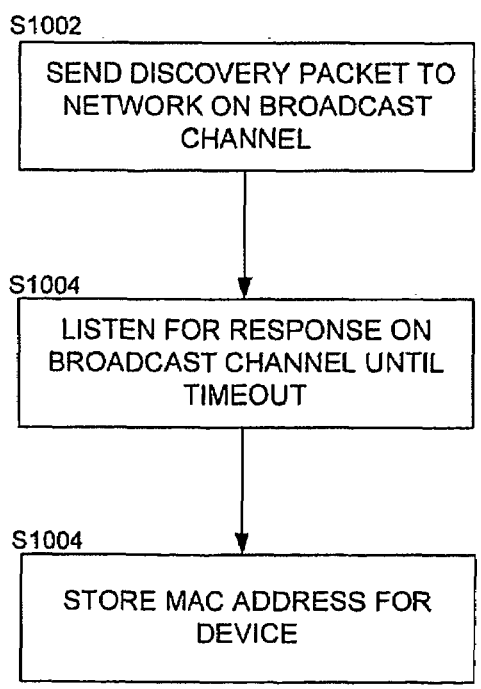
FIG. 10 shows a flow diagram of a device discovery procedure.

FIG. 10 shows a flow diagram of a device discovery procedure; this may also be used for discovering a device to which a data packet should be forwarded where the next link to the destination is not known. Thus at step S1002 the node sends a discovery packet to the network on the broadcast channel, then listens for a response on the broadcast channel (S1004) or until a timeout, and when a response is received stores the MAC address for the destination in a local link table (S1004). The discovery packet may take the same form as the above-described alert packet, the discovered device filling in any missing information in the packet and replying on the broadcast channel.

Figure 11A:
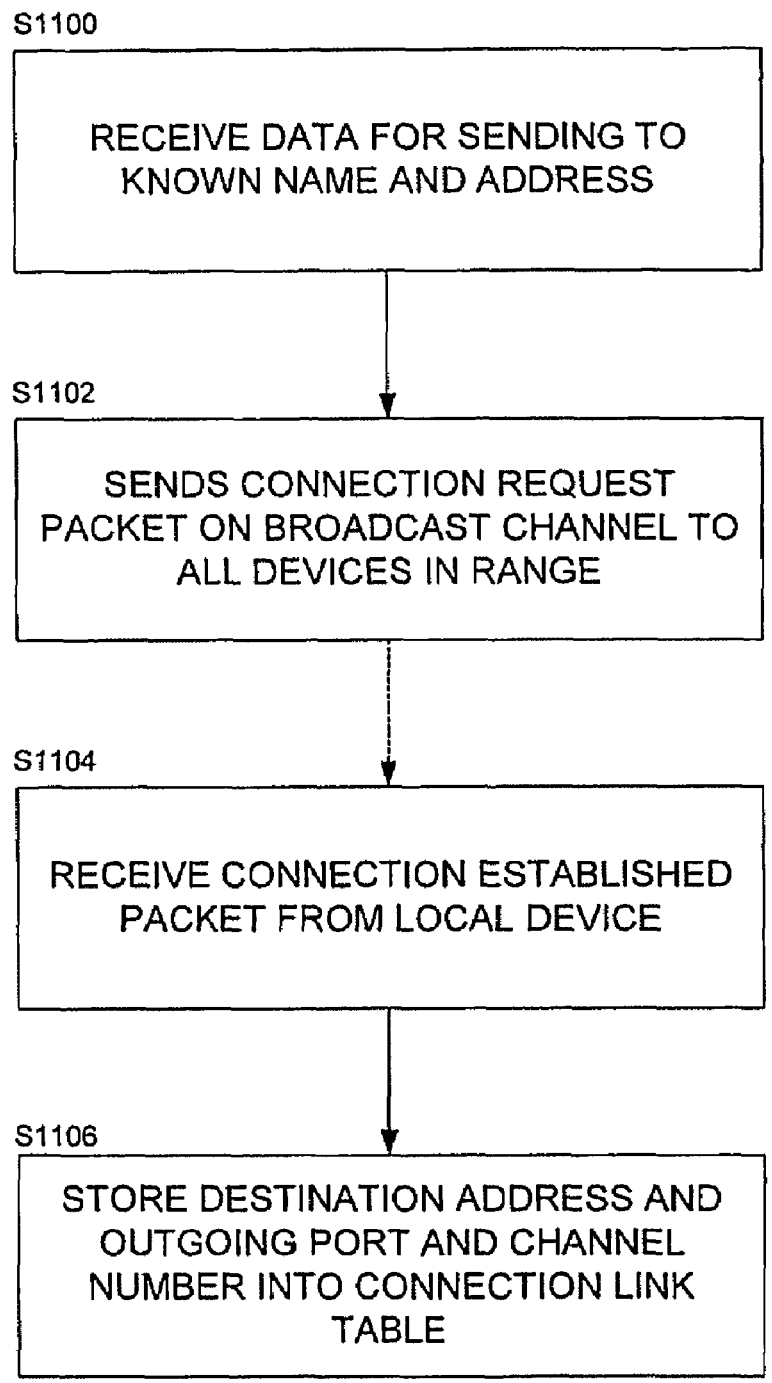
FIGS. 11a to 11d show, respectively, flow diagrams of a sending node connection establishing procedure, a forwarding node connection establishing procedure, a receiving node connection establishing procedure, and an example routing table structure.

FIG. 11*a* shows a flow diagram of a procedure for establishing a connection to a device as implemented at a node originating the data to be sent. Broadly speaking to establish a connection a node needs to assign a transmit port and channel number to the first link in a chain of nodes leading to the final destination. Thus, broadly speaking, the node wishing to establish a connection broadcasts a request which ripples out through the network until it reaches the desired destination, which then replies back along the chain of devices which led to the node. The destination node may wait to see whether the connection request reaches it by more than one path and may then select the preferred path, for example based upon a quality measure such as latency. When the connection is confirmed back through the network each link in the chain confirms an entry in its connection table so that when it receives a packet intended for that destination it knows on which port and channel to retransmit the packet. Thus at each node a purely local routing procedure may be employed so that incoming data on one channel is immediately sent out on a second channel as determined by looking up the second channel in a connection table linking the incoming and outgoing channels, unless the node is the final destination of the packet. Since packets intended for more than one destination may arrive at a node on the same incoming channel (depending upon the topology of the network) destination information such as a destination MAC address may be included in the connection table so that an incoming channel and destination determine an outgoing channel for retransmission of a packet. In embodiments the condition is that the routing tables must hold an identifier that uniquely identifies the (bi-directional) path through the network. This may either be a paired source-destination MAC address, or a specialised network (not UWB) channel number that serves the same purpose. The former approach is preferred, since it avoids the need for customised LLC/SNAP encapsulation.

Referring now to FIG. 11*a* at step S1100, the UWB network device receives data for sending to a known name and address, that is the name and address the selection of which is described above with reference to FIG. 8. For example a user may select a television as the destination for data from a video player, or a printer as the destination of data from a computer. Then at step S1102 the node broadcasts a connection request packet to all other UWB network nodes within range. This connection request includes the name and address of the recipient to facilitate matching on either or both, and an initial packet hop count which, as previously described, is decremented on each hop through the network. The connection request packet may also include quality-related data such as a desired bandwidth, and also data which is updated during the packet's passage through the network to facilitate determination of a quality measure of transmission.

The response to the connection request is sent back along a chain down which it was received and in one embodiment the destination node responds only to the first connection request packet it receives. Thus at step S1104 the node waits to receive such a connection established packet, which in a chain comprising more than two nodes will be received from a local intermediate node in the chain. Once the connection established packet has been received the immediate next link in the chain to the final destination device is known and thus at step S1106 the node stores the destination address and outgoing port and channel number for this next link in the chain to the final destination into a connection link table.

Figure 11B:
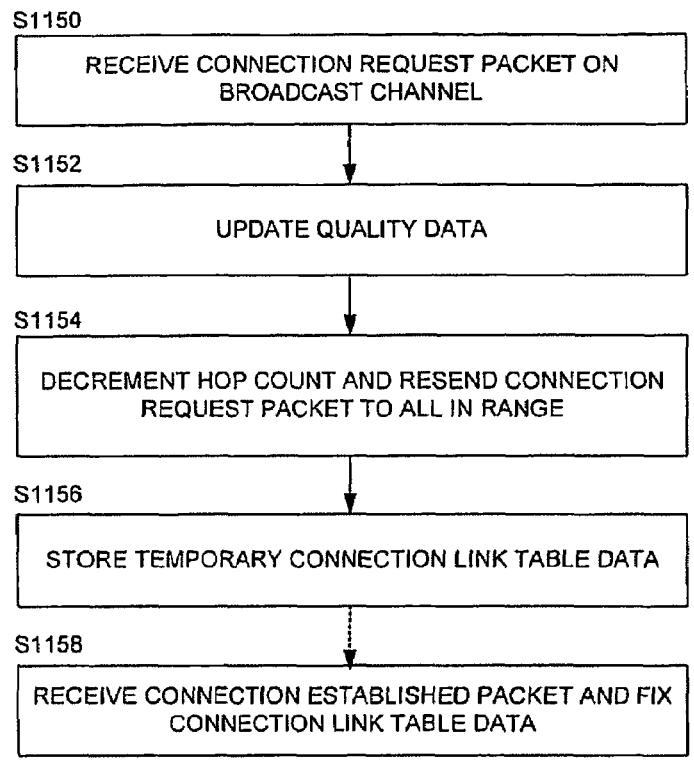

FIG. 11*b* shows the procedure at an intermediate node in a chain between originating and destination nodes when a connection is established in the network. This is the procedure which may be implemented, for example, by node 352 of FIG. 3*b* when node 350 is attempting to establish a communication link with node 356. Thus at step S1150 a connection request packet is received on the broadcast channel and, optionally, at step S1152 quality data within the packet is updated. Thus in the case of bandwidth data the bandwidth of a chain is determined by the lowest bandwidth of any link in the chain and thus the bandwidth data is updated if the incoming bandwidth is less than that specified in the packet. The latency, however, is the sum of the latencies of all the links in the chain and thus latency data within the packet is incremented at each node. Then at step S1154 the connection request packet is resent on the broadcast channel to all nodes within range except the node from which the packet was received after having decremented the packet hop count. An entry is also temporarily written into the connection link table at step S1156 defining the incoming channel (and port number) and outgoing channel (and port number) together with the final destination address, for each node to which the packet is broadcast. This data is automatically erased after a timeout period unless, at step S1158, a connection established packet is received back from the final destination, in which case the entry in the connection link table corresponding to the link from which the connection established packet was received is retained.

Figure 11C:
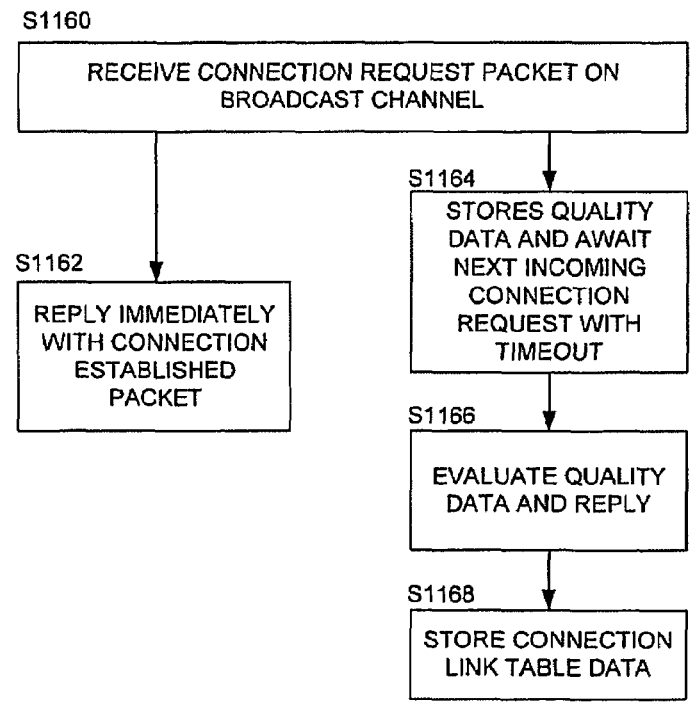

FIG. 11*c* shows procedures implemented at the final destination node, such as node 356 of FIG. 3*b* in the above example, when a connection request packet is received. Thus at step S1160 a connection request packet is received on the broadcast channel and, in one embodiment of the procedure, the node immediately replies (step S1162) with a connection established packet to the node from which the connection request packet was received. The connection established packet may have any format that includes (i) an indication that this packet is establishing the connection and (ii) the network channel identifier associated with the connection (for example, the paired source-destination MAC addresses—these plus the physical port are sufficient for a device to identify the appropriate routing table entry).

In an alternative embodiment of the procedure following step S1160 the node, at step S1164, stores link quality data held in the packet and awaits at least one further incoming connection request packet, or until a timeout period has expired if no such further packet is received. Then at step S1166 the node evaluates the quality data and selects one of the two or more nodes from which the connection request was received to reply to, based upon the quality data. The destination node then stores connection link table data for this final link in the connection chain at step S1168. In practice the first received packet often provides the best quality or at least lowest latency but a quality evaluation may be performed relatively quickly in a high speed UWB network and the timeout at step S1164 may be less than one second. Selecting a link dependant upon a desired quality measure for data to be sent over the link is particularly useful for streamed media data such as video data and/or audio data where latency and delays in data packets arriving can easily disrupt a user's perception of the quality of the received data stream. For similar reasons it is often also desirable to allocate a minimum bandwidth to links for streamed media data and the above described techniques facilitate this.

Figure 11D:
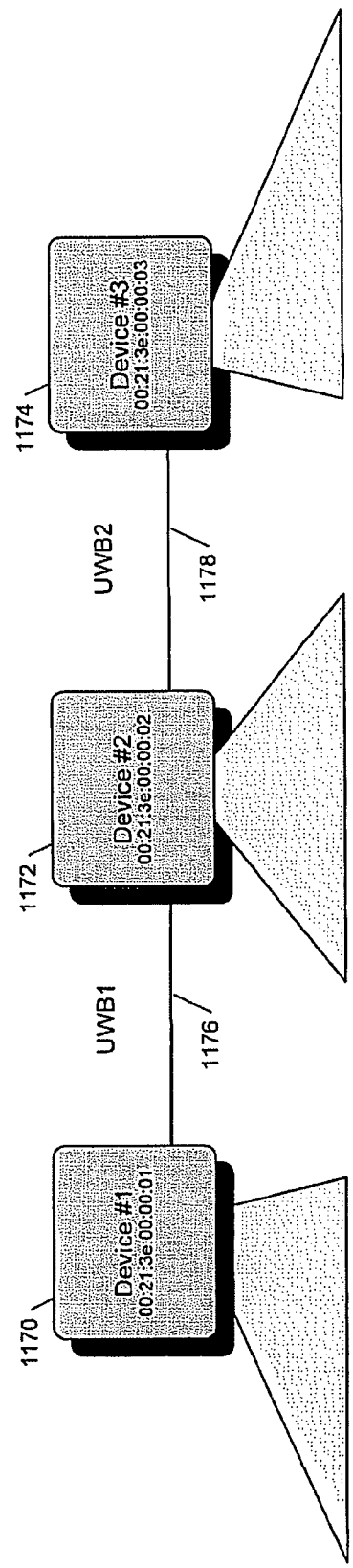

FIG. 11*d* shows an example routing table structure using paired MAC (Media Access Control) addresses as connection identifiers, each MAC address comprising 6 octets. In more detail FIG. 11*d* shows a connection within a UWB mesh between an originating device 1170 (Device#1), an intermediate device 1172 (Device#2) and a destination device 1174 (Device#3) showing routing table entries for links in the chain. Thus, Device#1 has an MAC address 00:21:3e:00:00:01 and participates in UWB radio channel UWB1 1176; Device#2 has MAC address 00:21:3e:00:00:02 and participates in both UWB radio channel UWB1 1176 and a second UWB radio channel UWB2 1178; and Device#3 has MAC address 00:21:3e:00:00:03 and also participates in the UWB radio channel UWB2 1178. The routing table in Device#2 1172 forwards data between the two networks.

Figure 12:
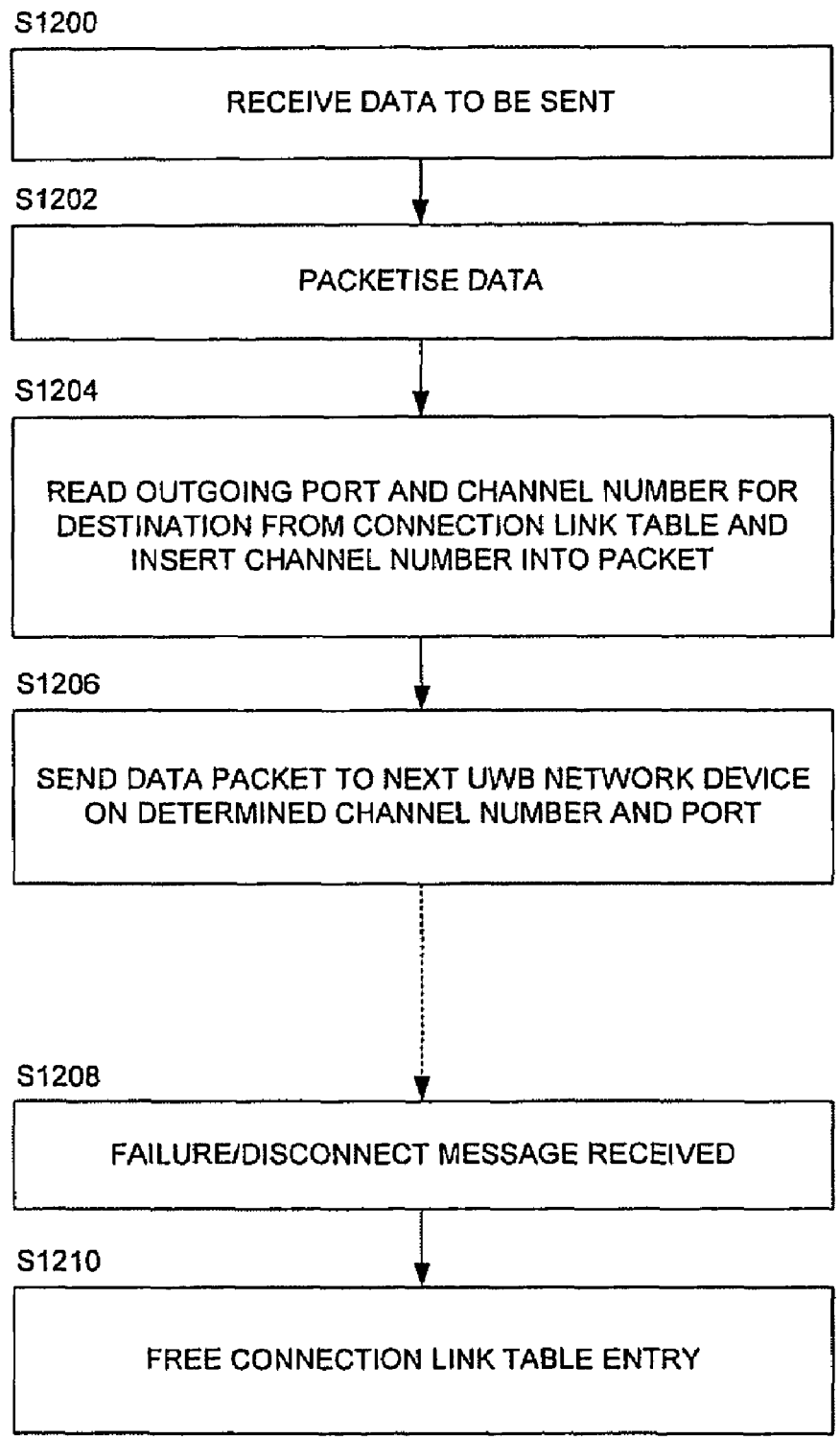
FIG. 12 shows a flow diagram of a data send procedure.

Once a 'connection' has been established between a pair of UWB devices data can be sent from one to the other as shown in the procedure of FIG. 12. Thus at step S1200 the node receives data to be sent, for example from a host processor, and a destination for the data and at step S1202 packetises this data, providing a source and destination address and channel handle (in some embodiments the destination address may be used as a channel handle or channel identifier). Then at step S1204 the node uses the destination to look up the outgoing port and channel number to use for transmitting the data to be sent along the next link in the chain, and also inserts the channel number into field 716 of the packet to be transmitted. The node then sends the data packet (S1206) to the next network node using the determined port and channel number. This data is received and forwarded by the next node as described further below. Where a transmission protocol is employed which requires an acknowledgement a transmission failure message may be received at step S1208 in which case the appropriate connection link table entry is freed and, if desired, the network may attempt to establish a connection to the intended destination along a different path. Similarly a connection disconnect message may be received at step S1208 in which case again the corresponding entry in the link table is freed (or erased). In some embodiments of the network it may not be immediately apparent when a message has not been successfully transmitted along a chain of nodes in which case a periodic check of one or more established connections may be made, for example by sending data from one end to the other of the connection and back. This may be implemented as a form of network heartbeat to determine which connections are live and which are dead.

Figure 13:
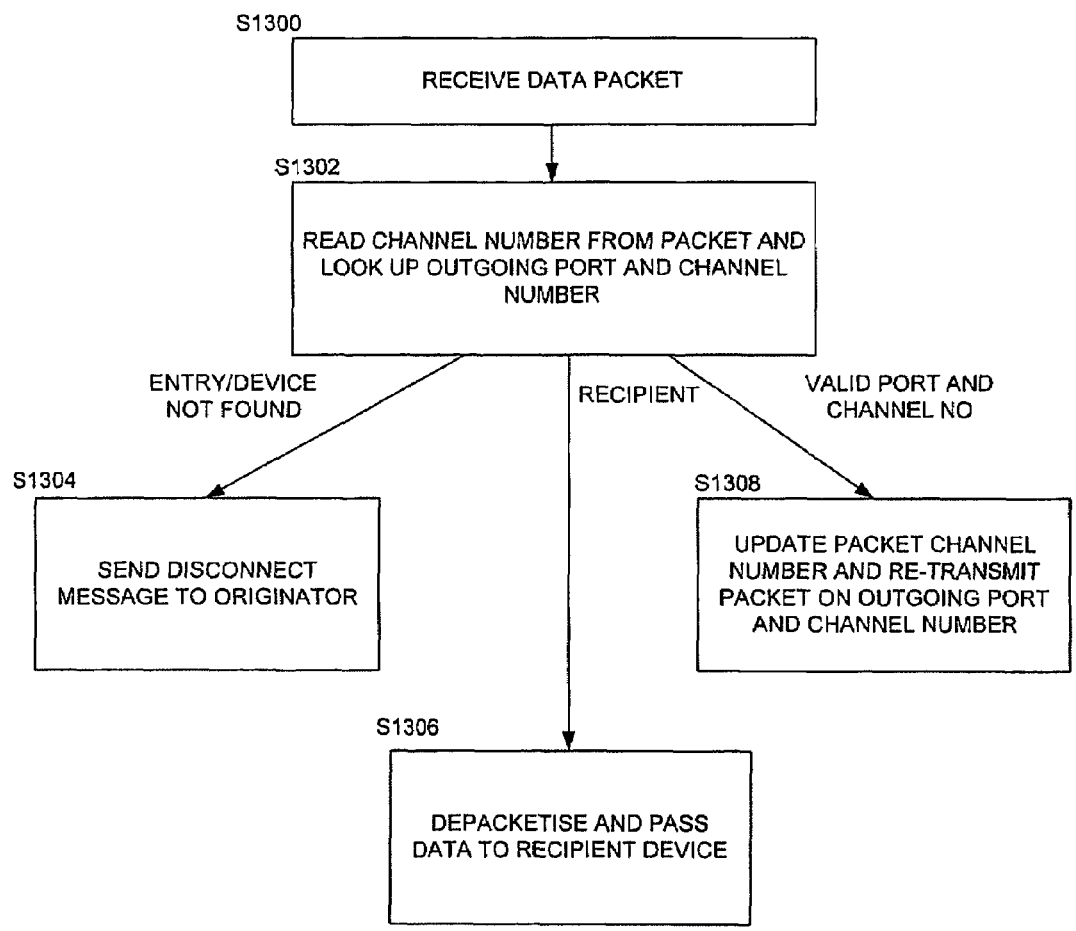
FIG. 13 shows a diagram of a data receive procedure

FIG. 13 shows procedures which may be implemented at a store and forward node within the network and at a packet destination node of the network. Thus at step S1300 the node receives a data packet and at step S1302 reads the channel number field 716 of the packet and the destination address. Note, however, that if paired MAC addresses are used in preference to a channel number, their values need not be and are preferably not re-written at transmission from an intermediate node (the MAC address space is huge in comparison with a small integer number, and so dynamic assignment of channel numbers is not necessary). The channel number and/or destination address may be employed by the node to determine whether the node is the final intended destination of the packet (for example a range of channels could be specified for use where a recipient is a final packet destination). Where the node is the final recipient at step S1306 the node depacketises the data and passes the depacketised data to the intended recipient device, for example a television, using second interface 612.

Where the node is not the intended final destination for the data at step S1302 the incoming channel number and destination address are used to look up an outgoing port and channel number in the locally stored connection table data for the node; this step may also be performed to identify a final intended recipient where indicated, for example, by a flag in this table. Where the table entry specifies a valid port and channel number the node, at step S1308, updates the packet channel number field 716 and retransmits the packet on the determined outgoing port and channel number, thus forwarding the packet along the next link in the chain. Where no valid entry is found in the connection link table for the destination and incoming channel number, or where no acknowledgement is received from the next node in the chain, the node sends a disconnect message (S1304) back along the links of the chain to the originator of the sent data, each intermediate node and the originating node tearing down the connection by erasing the relevant entry in the connection link table as the message propagates.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A controller for an ultra-wideband (UWB) network node, the controller comprising:
   a processor having a processor control bus and a processor data bus;
   processor memory coupled to said processor data bus;
   buffer memory coupled to a second data bus;
   a memory access controller coupled to said second data bus and to said processor control bus; and
   a UWB interface for interfacing to a UWB communications device, coupled to said processor control bus and to said second data bus; and
   wherein said processor is master of said processor control bus and said memory access controller is master of said second data bus.

2. The controller of claim 1, wherein the processor memory includes program memory and/or data memory.

3. The controller of claim 2, wherein the memory access controller is configured to move packet header data from the buffer memory to the data memory.

4. The controller of claim 1 further comprising a second interface coupled to said processor control bus and to said second data bus.

5. The controller of claim 4, wherein the second interface includes at least one of: a PCI interface, an Ethernet interface, or a second UWB interface.

6. The controller of claim 4, wherein the second interface interfaces to a host processor associated with at least one of: a television, a computer, or a set top box.

7. The controller of claim 1, wherein the UWB communications device performs forward error correction.

8. The controller of claim 1, wherein the buffer memory is used to buffer transmitted packet data.

9. The controller of claim 1, wherein the memory access controller includes a plurality of registers accessible to the processor via the processor control bus.

10. The controller of claim 9, wherein the plurality of registers is used to store packet control information.

11. The controller of claim 10, wherein the packet control information includes channel handle information.

12. The controller of claim 1, further comprising additional memory appended to the buffer memory.

13. The controller of claim 1, wherein the additional memory includes at least one of: flash memory or SDRAM.

* * * * *